United States Patent
Osaka et al.

(10) Patent No.: US 7,369,042 B2
(45) Date of Patent: May 6, 2008

(54) WARNING DEVICE FOR VEHICLES

(75) Inventors: Tadashi Osaka, Kashiwa (JP); Ryoko Ichinose, Tsukuba (JP); Kazushi Yoshida, Kasumigaura (JP); Youichi Horii, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 11/252,582

(22) Filed: Oct. 19, 2005

(65) Prior Publication Data

US 2006/0097857 A1 May 11, 2006

(30) Foreign Application Priority Data

Oct. 20, 2004 (JP) ............................ 2004-305890

(51) Int. Cl.
*B60Q 1/00* (2006.01)
*H04B 3/36* (2006.01)
*G08B 3/00* (2006.01)

(52) U.S. Cl. .................. 340/435; 340/407.1; 340/903; 340/425.5; 340/965; 340/7.6; 340/825.19; 340/667; 340/988; 701/1; 701/301

(58) Field of Classification Search ................. 340/435, 340/407.1
See application file for complete search history.

(56) References Cited

U.S. PATENT DOCUMENTS

| | | | | |
|---|---|---|---|---|
| 3,157,853 | A * | 11/1964 | Hirsch | 340/965 |
| 7,245,231 | B2 * | 7/2007 | Kiefer et al. | 340/903 |
| 2002/0145512 | A1 * | 10/2002 | Sleichter et al. | 340/407.1 |
| 2003/0229447 | A1 * | 12/2003 | Wheatley et al. | 701/300 |
| 2004/0049323 | A1 * | 3/2004 | Tijerina et al. | 701/1 |
| 2005/0110348 | A1 * | 5/2005 | Hijikata et al. | 307/10.1 |
| 2005/0174223 | A1 * | 8/2005 | Egami et al. | 340/440 |

FOREIGN PATENT DOCUMENTS

| JP | 09-164858 | 6/1997 |
|---|---|---|
| JP | 2000-225877 | 8/2000 |

* cited by examiner

*Primary Examiner*—Bonnie L. Crosland
(74) *Attorney, Agent, or Firm*—Crowell & Moring LLP

(57) ABSTRACT

A vehicle warning system has an obstacle sensor for detecting approach of an obstacle to a vehicle, tactile information-generating elements for notifying a driver of the obstacle information based on information received from the obstacle sensor, and a controller for controlling the actuation of the tactile information-generating elements. The tactile information-generating elements are installed in the cushion of a driver seat, with a fore-and-aft and/or left-right arrangement. The controller controls the tactile information-generating elements based on the information from the obstacle sensor as well as information from one or more of a steering wheel-sensor, a blinker sensor, a brake sensor, and a vehicle speedometer.

10 Claims, 18 Drawing Sheets

FIG. 14

| STATUS | OBSTACLE SENSOR HAVING DETECTED AN OBSTACLE | TACTILE INFORMATION-GENERATING ELEMENT(S) TO BE ACTUATED |
|---|---|---|
| APPROACHING OBSTACLE FORWARDS ON THE LEFT | FORWARDS ON THE LEFT 2a | FORWARDS ON THE LEFT 4a |
| APPROACHING OBSTACLE FORWARDS ON THE RIGHT | FORWARDS ON THE RIGHT 2b | FORWARDS ON THE RIGHT 4b |
| APPROACHING OBSTACLE BACKWARDS ON THE LEFT | BACKWARDS ON THE LEFT 2c | BACKWARDS ON THE LEFT 4c |
| APPROACHING OBSTACLE BACKWARDS ON THE RIGHT | BACKWARDS ON THE RIGHT 2d | BACKWARDS ON THE RIGHT 4d |
| APPROACHING OBSTACLE FORWARDS | FORWARDS ON THE LEFT 2a , FORWARDS ON THE RIGHT 2b | FORWARDS ON THE LEFT 4a , FORWARDS ON THE RIGHT 4b |
| APPROACHING OBSTACLE BACKWARDS | BACKWARDS ON THE LEFT 2c , BACKWARDS ON THE RIGHT 2d | BACKWARDS ON THE LEFT 4c , BACKWARDS ON THE RIGHT 4d |
| APPROACHING OBSTACLE ON THE LEFT | FORWARDS ON THE LEFT 2a , BACKWARDS ON THE LEFT 2c | FORWARDS ON THE LEFT 4a , BACKWARDS ON THE LEFT 4c |
| APPROACHING OBSTACLE ON THE RIGHT | FORWARDS ON THE RIGHT 2b , BACKWARDS ON THE RIGHT 2d | FORWARDS ON THE RIGHT 4b , BACKWARDS ON THE RIGHT 4d |
| RECEIVE A LEFT-TURN SIGNAL FROM THE CAR NAVIGATION SYSTEM | — | FORWARDS ON THE LEFT 4a , BACKWARDS ON THE LEFT 4c |
| RECEIVE A RIGHT-TURN SIGNAL FROM THE CAR NAVIGATION SYSTEM | — | FORWARDS ON THE RIGHT 4b , BACKWARDS ON THE RIGHT 4d |

SIMULTANEOUS ACTUATING AND STOP

SIMULTANEOUS ACTUATING AND STOP
(CYCLIC DRIVE)

ALTERNATE ACTUATING AND STOP

DISTANCE FROM THE OBSTACLE $T_8 > T_9 > T_{10}$ $T_{12} < T_{13} < T_{14} < T_{15}$

WARNING DEVICE FOR VEHICLES

BACKGROUND OF THE INVENTION

1. Field of the Invention

The present invention relates to a vehicle warning system for exerting tactile information such as vibration or pressure on a driver when notifying the driver of an approaching obstacle or guiding the driver to a destination by connection with a car navigation system.

2. Prior Art

The conventional system for warning a driver of an approaching obstacle through detection of an obstacle is disclosed in Japanese Application Patent Laid-Open Publication No. Hei 9-164858 (Patent Document 1). The system described in Patent Document 1 is equipped with a sensor for detecting the status of an object to be detected and a plurality of vibrators installed on a vehicle part in contact with a driver. These vibrators issue a warning with vibration and exert the vibration on the driver to notify contents of the warning to the driver. The selection of some vibrators to be actuated or timing of driving the vibrators is controlled according to the result of detection by the sensor.

The conventional system that uses vibration to notify approach of an obstacle including another vehicle from all directions (right/left and back/forth directions) is disclosed in Japanese Application Patent Laid-Open Publication No. 2000-225877 (Patent Document 2). The system shown in Patent Document 2 contains a plurality of obstacle detecting sensors, a pair of vibrators provided on a seat cushion with a left-right arrangement, and a vibrator provided on the back seat. It is designed to actuate the corresponding vibrators out of all vibrators according to the direction of obstacle detection.

SUMMARY OF THE INVENTION

Problems to be Solved by the Invention

In these previously known systems, the system in patent document 1 is described that the information as to an obstacle-approaching direction is notified to drivers by sequentially switching a plurality of vibrators to be actuated. This arrangement requires many vibrators to be installed, and will lead to a cost increase. Further, the driver is required to memorize various sequential switching patterns for actuating vibrators in connection with an obstacle-detection in the front and rear. According to this arrangement, the driver can not identify easily intuitively the approaching position of the obstacle. Further, even when the driver has already been aware of an obstacle, since the vibrators are actuated immediately when the sensor detects an obstacle, this causes discomfort to the driver.

The system in patent document 2 warns of the approach of an obstacle in right/left and back/forth directions to the vehicle from all directions, using a pair of vibration generators provided on the right and left of the seat-cushion and one vibration generator provided on the seat back. The actuating states of the vibrators are changed in response to the traveling state of the vehicle. When an obstacle sensor detects an obstacle located in the rear during the traveling of the vehicle, the vibrators on the right and left of the seat-cushions are actuated. At the time of parking of the vehicle, the vibrators on the right and left of the seat-cushion and the vibrators on the seat back are actuated. As described above, the vibrators to be actuated are changed in response to the traveling state of the vehicle. This may cause the driver to be confused. Further, when the driver has taken action to avoid collision, the drive gains of the vibrators are reduced. However, even if the driver has been aware of an approaching obstacle from the beginning, the vibrators are driven. This will give an unpleasant feeling to the driver.

The present invention is to provide a vehicle warning system capable of ensuring easy identification of an approaching object by the driver, or guiding the driver to a destination by a car navigation system by allowing the driver to keep watching ahead. And the system doesn't issue a warning if the driver has recognized that there is an approaching obstacle or his vehicle is being guided to the destination.

Means for Solving the Problems

The present invention is characterized by the following structure:

A vehicle warning system comprises: an obstacle sensor for detecting approach of an obstacle to a vehicle;

tactile information-generating elements for notifying a driver of the obstacle information based on the information of the obstacle sensor; and a controller for controlling the actuation of the tactile information-generating elements. The tactile information-generating elements are installed in a cushion of a driver seat with a fore-and-aft arrangement and/or a left-right arrangement. The obstacle sensor is used for measuring the distance from the obstacle and relative velocity of the obstacle as viewed from the vehicle. The controller controls the tactile information-generating elements based on the information from the obstacle sensor and information as to any of a steering wheel-sensor, a winker-sensor, a brake-sensor, and a vehicle-speedometer.

Another vehicle warning system comprises:

a car navigation system for guiding a vehicle along a route up to a destination;

tactile information-generating elements for providing tactile information as a cue to a driver based on information from the car navigation system, and a controller for controlling tactile information-generating elements.

The tactile information-generating elements are installed in a cushion of a driver seat with a fore-and-aft arrangement and/or a left-right arrangement, the car navigation system outputs a route-direction information for guidance. The controller controls the tactile information-generating elements based on said route-direction information from the car navigation system and information from a winker for outputting right/left turn signal.

Effects of the Invention

The present invention ensures easy identification of an approaching object by the driver, and guides the driver to a destination by a car navigation system by allowing the driver to keep watching ahead.

The present invention also ensures that a warning is not issued if the driver has been aware of the approaching obstacle or the guide to the destination.

BRIEF DESCRIPTION OF THE DRAWINGS

FIG. 14 is a diagram representing the correspondence between the information from the obstacle sensors and car navigation system, and the tactile information-generating elements to be driven as an embodiment of the present invention;

DETAILED DESCRIPTION OF THE INVENTION

Best Form of Embodiment of the Present Invention

The vehicle warning system of the present invention will be described in details with reference to FIGS. 1 through 32. In the vehicle warning system of the present invention, a plurality of tactile information-generating elements are installed in the upper portion of the driver seat. These tactile information-generating elements are actuated to notify the driver of the approach of another car or an obstacle, or are connected with a car navigation system to guide the driver to a destination.

Figure 1:
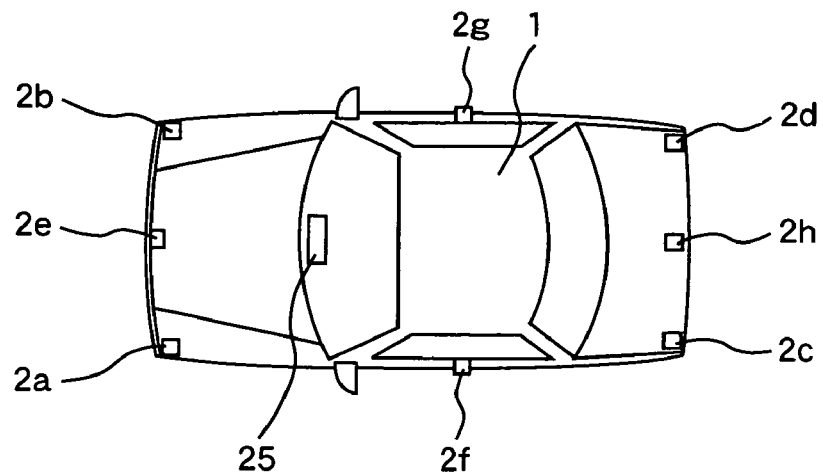
FIG. 1 is a drawing representing the schematic structure of the vehicle provided with a vehicle warning system as an embodiment of the present invention.

FIG. 1 is a drawing representing the overview of the vehicle provided with a vehicle warning system of the present invention. The vehicle is a general automobile, the warning system provided thereof will be described with reference to FIG. 1. As shown in FIG. 1, the vehicle is equipped with an obstacle sensor 2 (Specifically, a plurality of obstacle sensors 2a through 2h are provided) for detecting the approach of an obstacle to the vehicle warning system, and a car navigation system 25 for guiding the driver to a destination.

To detect approach of an obstacle to the vehicle from left-and-right and fore-and aft directions, the obstacle sensors 2 are mounted at least four positions of a body 1 of the vehicle. In order to detect at least one obstacle located forwards on the right and left, and backwards on the right and left of the vehicle, the obstacle sensors 2a, 2b, 2c, and 2d are installed forwards on the right and left, and backwards on the right and left of the body 1. Further, in order to expand the range of detecting the approach of an obstacle to the vehicle, obstacle sensors 2e, 2f, 2g and 2h can be added, as shown in FIG. 1, to the aforementioned sensors 2a, 2b, 2c, and 2d. The following describes the case where four obstacle sensors are mounted. The following description also may apply to the case where more than four obstacle sensors are mounted.

Each obstacle sensors 2 is used to detect various obstacles such as approaching-obstacles (including the wall of a building when the vehicle is put into a garage), other cars or passengers. The sensor 2 measures a distance from the obstacle and a relative velocity of the obstacle as viewed from the vehicle. The relative velocity can be obtained by measuring the positions between the vehicle with the sensor 2 and the obstacle at the present and past time points. A millimeter wave radar is used as the obstacle sensor 2, for example. However, others can be used if the same advantages can be obtained.

The car navigation system 25 is mounted on the console portion of the vehicle. When a destination has been inputted by a driver, the car navigation system 25 selects the optimum route and guides the driver to the destination. A voice instruction or a display instruction on the liquid crystal display of the car navigation system 25 is used to guide the driver to the destination. The car navigation system 25 ensures that the information of direction to reach the destination (right/left turns) is outputted to the outside.

Figure 2:
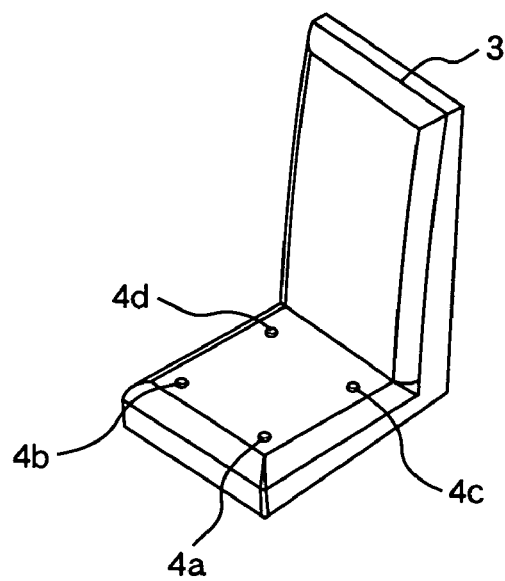
FIG. 2 is a drawing representing the schematic structure of the car seat provided with the vehicle warning system of the present invention.
Figure 3:
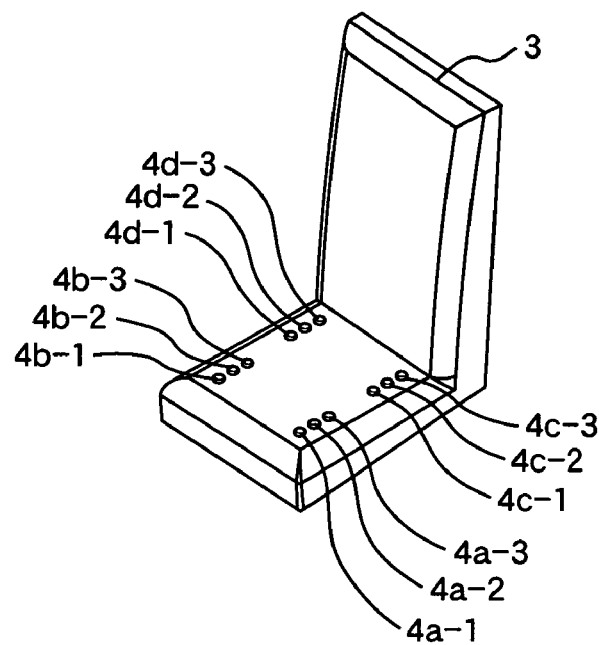
FIG. 3 is a drawing representing another example of the structure of the car seat provided with a plurality of tactile information-generating elements.

FIG. 2 is a drawing representing the car seat provided with the vehicle warning system of the present invention. In FIG. 2, a plurality of tactile information-generating elements 4 (specifically denoted by 4a through 4d in FIG. 2) are disposed on the surface of a seat 3. These tactile information-generating elements 4 are arranged so as to be in contact with the buttocks and femoral region. These tactile information-generating elements 4 are actuated to notify of tactile information. Further, at least four tactile information-generating elements 4 (4a through 4d in FIG. 2) are installed to corresponds to the obstacle sensors 2a, 2b, 2c, and 2d mounted on the body 1. However, more than four tactile information-generating elements 4 can be installed, as shown in FIG. 3. FIG. 3 is a drawing representing other examples of the car seat provided with a plurality of tactile information-generating elements. The following describes the case where four tactile information-generating elements 4 are installed.

When each of tactile information-generating elements 4a, 4b, 4c and 4d has been driven, it is preferable that the driver can more easily identify which of the tactile information-generating elements 4a, 4b, 4c and 4d forwards on the right and left, and backwards on the right and left is driven. For that reason, they are arranged in positions as far as possible from one another. All the tactile information-generating elements 4 are arranged so as to be able to contact with the driver.

Figure 4:
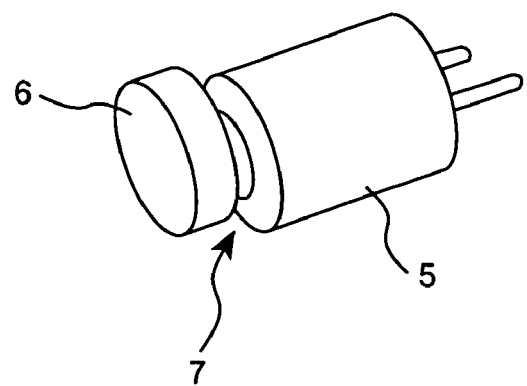
FIG. 4 is a drawing representing the structure of the vibrator as an example of the tactile information-generating elements of the present invention.
Figure 5:
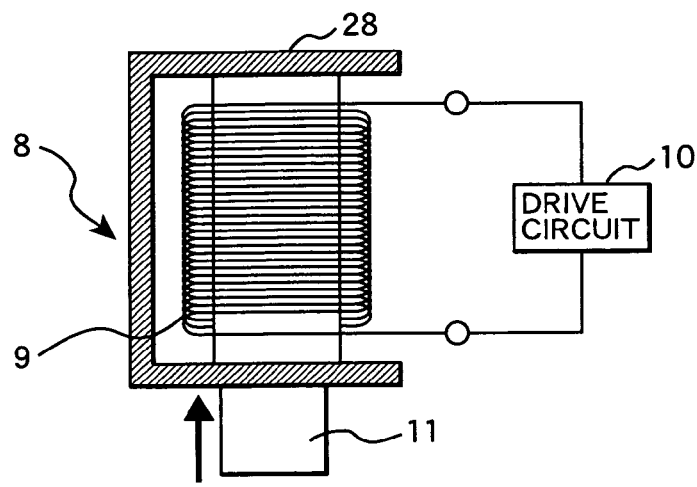
FIG. 5 is a drawing showing the structure of a solenoid as an example of the tactile information-generating element of the present invention.

FIG. 4 is a drawing representing the structure of the vibrator as an example of the tactile information-generating elements of the present invention. FIG. 5 is a drawing showing the structure of a solenoid as an example of the tactile information-generating elements of the present invention. Each tactile information-generating element 4 has an eccentric member 6 driven by a motor 5 shown in FIG. 4, and vibration is produced by the centrifugal force of the eccentric member 6. Hereinafter, a structure of one tactile information-generating element representatively expressed. Instead of such a structure, it is also possible to make such arrangement that the tactile information generating elements 4 applies pressure to the driver by a linear actuator such as a solenoid 8 shown in FIG. 5. The solenoid 8 shown in FIG. 5 generates a magnetic force by energizing a coil 9 by the drive circuit 10 which is connected to across the coil 9. A plunger 11 as a soft magnetic material is inserted into the coil 9. When energizing the coil 9, the plunger 11 is pulled up to produce the pressure for tactile information.

Further, the tactile information-generating elements 4 can be so designed as to make the driver feel temperature changes. For example, a Peltier device 12 can be used (FIG. 8) for them. The temperature of the Peltier device 12 is increased or decreased, thereby tactile information is provided to the driver.

As described above, it is sufficient only if the tactile information-generating elements 4 can inform to the driver the position where the tactile information has been applied on the surface of the seat 3. As long as the same effect can be obtained, other structures can be used.

The tactile information-generating elements 4 are capable of changing respective drive frequencies and drive forces. The drive frequency and drive force of each tactile information-generating element 4 is changed according to the distance between the vehicle and an obstacle. This will be described in detail later. For example, if the distance between the obstacle and vehicle is short, the drive frequency and drive force of the tactile information-generating element 4 are increased. If this distance is longer, the drive frequency and drive force of the tactile information-generating element 4 are decreased. This arrangement allows the driver to roughly estimate the distance from the obstacle.

Plural tactile information-generating elements 4 for providing the tactile information to the driver, are preferably disposed at the position constantly in contact with the driver during driving. Because, even if the elements 4 attempt to actuate the tactile information-generating elements 4 and to provide the tactile information, a warning cannot be informed if the driver is not in contact with the tactile information-generating elements 4. To solve this problem, the tactile information-generating elements 4 are disposed on the surface of the seat 3, as described above. The tactile information-generating elements 4 could be installed in the backrest. However, when the drive makes the vehicle back, for example, at the time of putting away his car in the garage, his back is turned on the backrest in non-contact with the backrest. The tactile information-generating elements 4 could be mounted on the steering wheel 8. However, the position of the steering wheel 8 to be held may be different depending on each driver, and the steering wheel 8 may be operated by one hand. With consideration given to the aforementioned points, the tactile information-generating elements 4 are preferably mounted on the surface of the seat 3 as in the present embodiment.

When the tactile information-generating elements 4 are provided on the surface of the seat 3, they are easily associated with a fore-and-aft arrangement and/or a left-right arrangement relative to the vehicle. The obstacle sensor 2a on the left front of the vehicle-body shown in FIG. 1 is associated with the tactile information-generating element 4a on the left front shown in FIG. 2; the obstacle sensor 2b on the right front is associated with the tactile information-generating element 4b on the right front; the obstacle sensor 2c on the rear left is associated with the tactile information-generating element 4c on the rear left; and the obstacle sensor 2d on the rear right is associated with the tactile information-generating element 4d on the rear right. This arrangement allows the driver to easily identify the direction in which an approaching obstacle is located.

Figure 6:
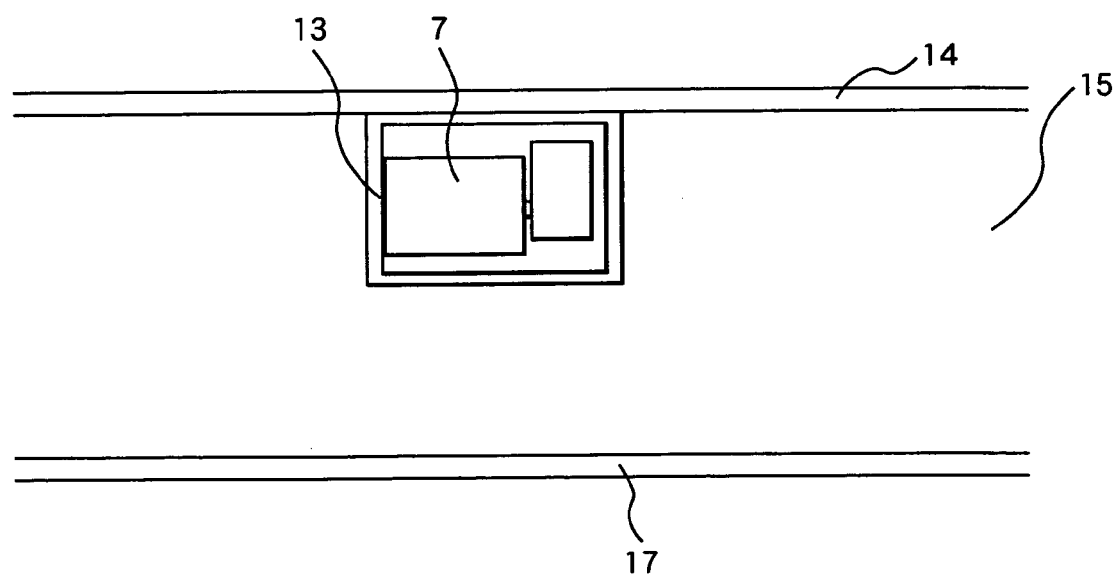
FIG. 6 is a drawing showing the structure of the seat equipped with vibrators as tactile information-generating elements.
Figure 7:
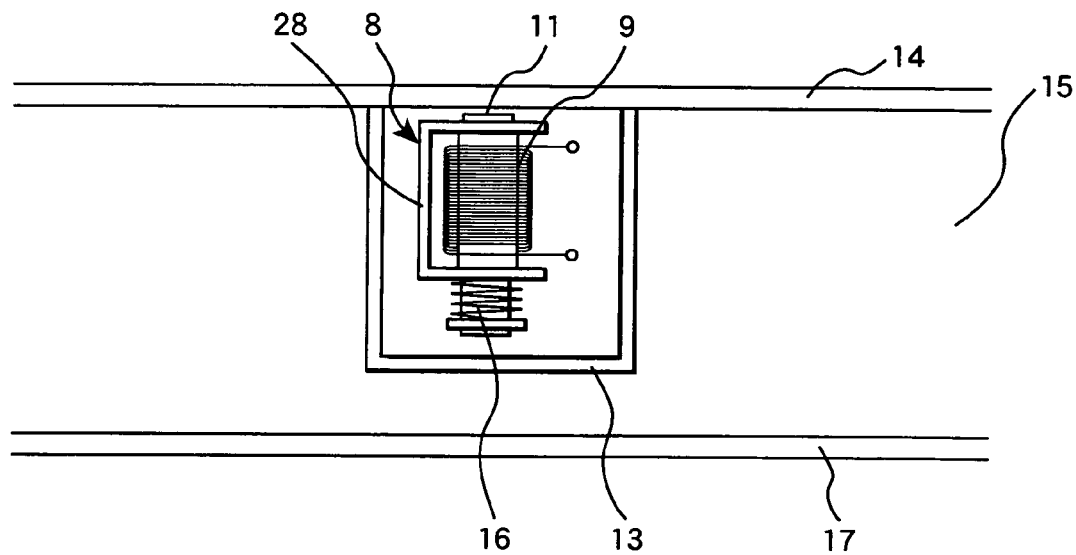
FIG. 7 is a drawing showing the structure of the seat equipped with solenoids as tactile information-generating elements.
Figure 8:
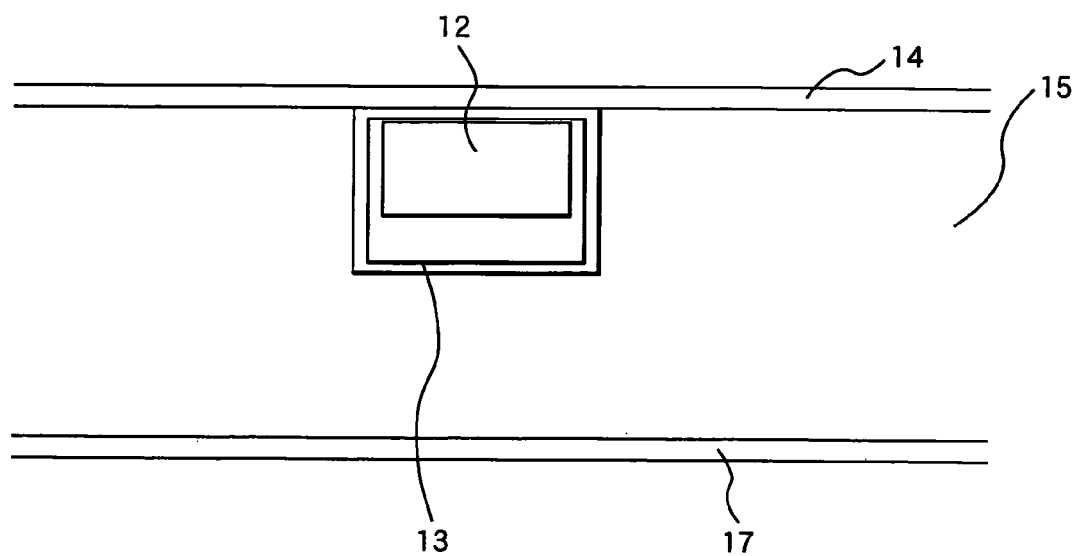
FIG. 8 is a drawing showing the structure of the seat equipped with Peltier devices as tactile information-generating elements.

Referring to schematic view showing the cross section of the seat 3 shown in FIGS. 6 through 8, the following describes the structure of the seat 3 equipped with the tactile information-generating element 4 (FIGS. 6 through 8 are representatively shown one out of the elements 4). FIG. 6 is a drawing showing the structure of the seat 3 equipped with vibrators 7 as the tactile information-generating element 4. FIG. 7 is a drawing showing the structure of the seat 3 equipped with solenoids 8 as the tactile information-generating element 4. FIG. 8 is a drawing showing the structure of the seat 3 equipped with Peltier devices 12 as the tactile information-generating element 4.

The structure of the seat 3 equipped with vibrators 7 shown in FIG. 6 will be described. The vibrators 7 are jointed with a box-like case 13. The vibrators 7 are enclosed in a case 13 to ensure that the vibrators 7 do not directly contact the seat cover 14 or a cushion 15 made of soft material. The case 13 is installed in the cushion 15.

The following describes the structure of the seat 3 equipped with the solenoids 8 shown in FIG. 7. The solenoids 8 are jointed to the case 13 and are enclosed in the case 13 so that the solenoids 8 will not be brought into contact with the seat cover 14 or cushion 15. The case 13 is installed in the cushion 15.

A compression spring 16 is mounted on the lower side of the solenoid 8 illustrated in FIG. 7. The top end of the compression spring 16 is jointed with the bracket 28 of the solenoid 8, and the bottom end thereof is joined with the plunger 11 of the solenoid 8. When the coil 9 of the solenoid 8 is not energized, the plunger 11 is pulled down by the spring force of the compression spring 16. When the coil 9 of the solenoid 8 is energized, the attraction of the solenoid 8 becomes greater than the spring force. This setting allows the plunger 11 to move upward, whereby the driver feels the pressure.

The seat cover 14 side of the case 13 (top surface of the case) is provided with a opening or hole (not illustrated) to ensure that the plunger 11 of the solenoid 8 moving in the vertical direction will not brought into contact therewith. This arrangement allows the plunger 11 to push up the seat cover 14, whereby the tactile information is provided to the driver. It is also possible to make such arrangements that the seat cover 14 is provided with a hole at the position of the plunger 11 of the solenoid 8 so that the plunger 11 will directly be brought into contact with the driver.

The following describes the structure of the seat 3 equipped with the Peltier device 12 shown in FIG. 8. The Peltier device 12 is jointed with the case 13, which is installed in the cushion 15. The surface of the case 13 in contact with the seat cover 14 is left open in order to improve the heat transfer efficiency. The temperature of the Peltier device on the seat cover side is increased or decreased corresponding to the direction of the current flowing to the Peltier device 12. It is also possible to arrange such a configuration that the direction of the current flowing to the Peltier device 12 is switched by the right/left turn signal of the car navigation system or the individual signal of the obstacle sensor.

The case 13 shown in FIGS. 6 through 8 is laid out so as to be brought into contact with the seat cover 14 to ensure that tactile information of the tactile information-generating elements 4 is correctly provided to the driver. The cushion 15 is equipped with a concave portion slightly greater than the case 13 and the case 13 is inserted into the concave portion, whereby the case 13 is set in position. Further, a cushion 15 is arranged between the lower surface of the case 13 and the lower base 17 of the seat 3 so that a sufficient distance will be ensured. Arrangements are made in such a way that the case 13 will not contact the lower base 17 even when the driver is sitting on the seat 3 and the seat 3 has sunken. This provides the driver with sufficient riding comfort.

Although FIGS. 6 through 8 illustrate only one of a plurality of tactile information-generating elements 4, other tactile information-generating elements 4 are installed in the same manner. The tactile information-generating elements 4 are installed in the cushion 15 as described above. According to this arrangement, it prevents vibration or heat from being provided to the other tactile information-generating elements 4, and allows the driver to correctly identify the position of the tactile information-generating elements 4 being actuated.

Figure 9:
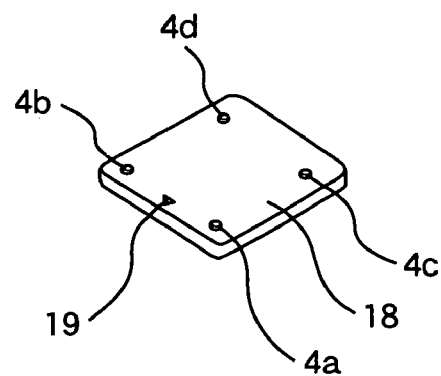
FIG. 9 is a drawing showing the outline of the cushion-like device equipped with the tactile information-generating elements as an embodiment of the present invention.

In the example shown above, reference has been made to the case where the tactile information-generating element 4 is mounted on the driver seat 3. The tactile information-generating elements 4a, 4b, 4c and 4d can be installed in a cushion-like device 18 shown in FIG. 9. FIG. 9 is a drawing showing the structure in cases where the tactile information-generating element of the present invention is mounted on the cushion-like device 18. When the vehicle warning system of the present invention is to be installed after purchase of the vehicle, this arrangement allows the driver to purchase the cushion-like device 18 and to easily install it, without having to replace the seat 3.

The structure of the cushion-like device 18 is the same as the one shown in FIGS. 6 through 8. The cushion-like device 18 is provided with a mark 19 so that the driver can easily identify the direction in which the cushion-like device 18 is installed. In FIG. 9, the position indicating the forward direction of the cushion-like device 18 is provided with the mark 19.

Figure 10:
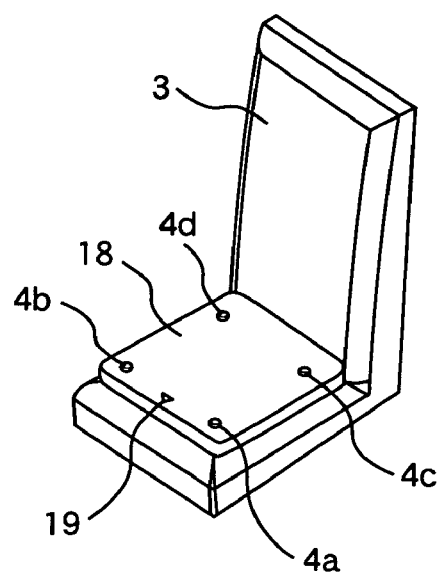
FIG. 10 is a drawing showing the cushion-like device as an embodiment of the present invention installed on the seat.

FIG. 10 is a drawing showing the cushion-like device 18 installed on the seat 3. The cushion-like device 18 is installed on the surface of the seat 3 so that the mark 19 is located in the forward direction. Thus, the cushion-like device 18 can be easily set by the driver.

Figure 11:
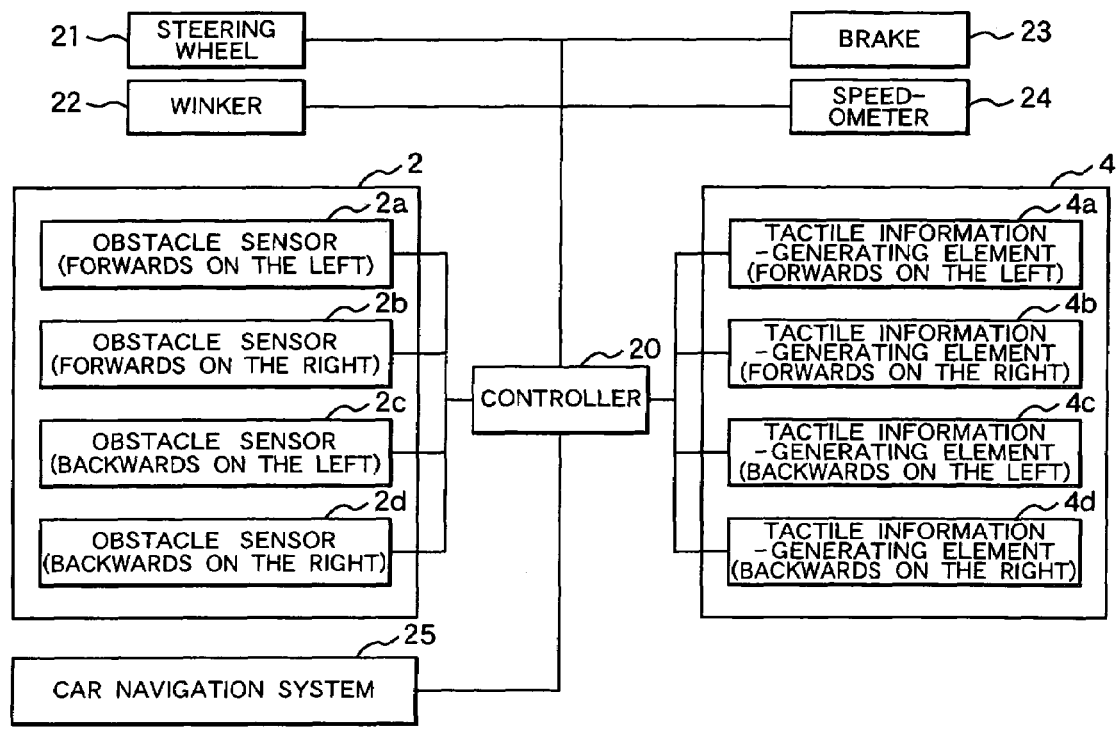
FIG. 11 is a block diagram representing the structure of a control system in the vehicle warning system as an embodiment of the present invention.

The following describes the control of the vehicle warning system as an embodiment of the present invention, with reference to the block diagram of FIG. 11. The controller 20 for controlling the vehicle warning system is connected with the obstacle sensors 2a, 2b, 2c and 2d, tactile information-generating elements 4a, 4b, 4c and 4d, steering wheel 21, winker 22, brake 23, speedometer 24, and car navigation system 25. The tactile information-generating elements 4a, 4b, 4c and 4d are controlled based on the information of the obstacle sensors 2a, 2b, 2c and 2d, steering wheel 21, winker 22, brake 23, speedometer 24, and car navigation system 25.

Figure 12:
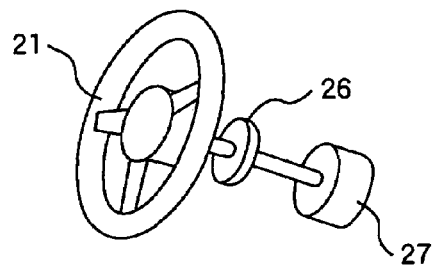
FIG. 12 is a drawing representing the structure of the steering wheel used in the vehicle as an embodiment of the present invention.

FIG. 12 is a drawing representing the structure of the steering wheel used in the vehicle as the embodiment of the present invention. The steering wheel 21 is provided with a steering angle sensor 26 for sensing the rotary direction of the steering wheel 21 and the steering angle, and a load application section 27 for applying load to the steering wheel 21, as shown in FIG. 12. The steering angle sensor 26 is an encoder, for example. However, other devices can be used if the same effect can be obtained. The load application section 27 applies heavy-loads to the steering wheel 21 so as to not be able to operate easily the steering wheel 21. The load application section 27 is an electromagnetic brake, for example. However, other devices can be used if the same effect can be obtained. In the steering wheel 21, the information sensed by the steering angle sensor 26 (e.g. rotary direction and steering angle) are sent to the controller 20, and on-off control of the load application section 27 is executed according to the signal from the controller 20.

The winker 22 on the vehicle-body indicates the direction of right/left turn when the driver operates a lever (not illustrated) close to the steering wheel, so that drivers of other vehicles are notified of the direction. In the winker 22, a right/left turn signal is sent to the controller 20. Further, the brake 23 applies a braking force when the driver has pressed the brake pedal (not illustrated). The information on whether or not the driver has pressed the brake pedal is sent to the controller 20 of the present invention, as well as to the brake lamp (not illustrated) on the body 1. The speedometer 24 measures the traveling speed of the vehicle and indicates it on the console. The information of the vehicle-traveling speed measured by this speedometer 24 is sent to the controller 20.

Figure 13:
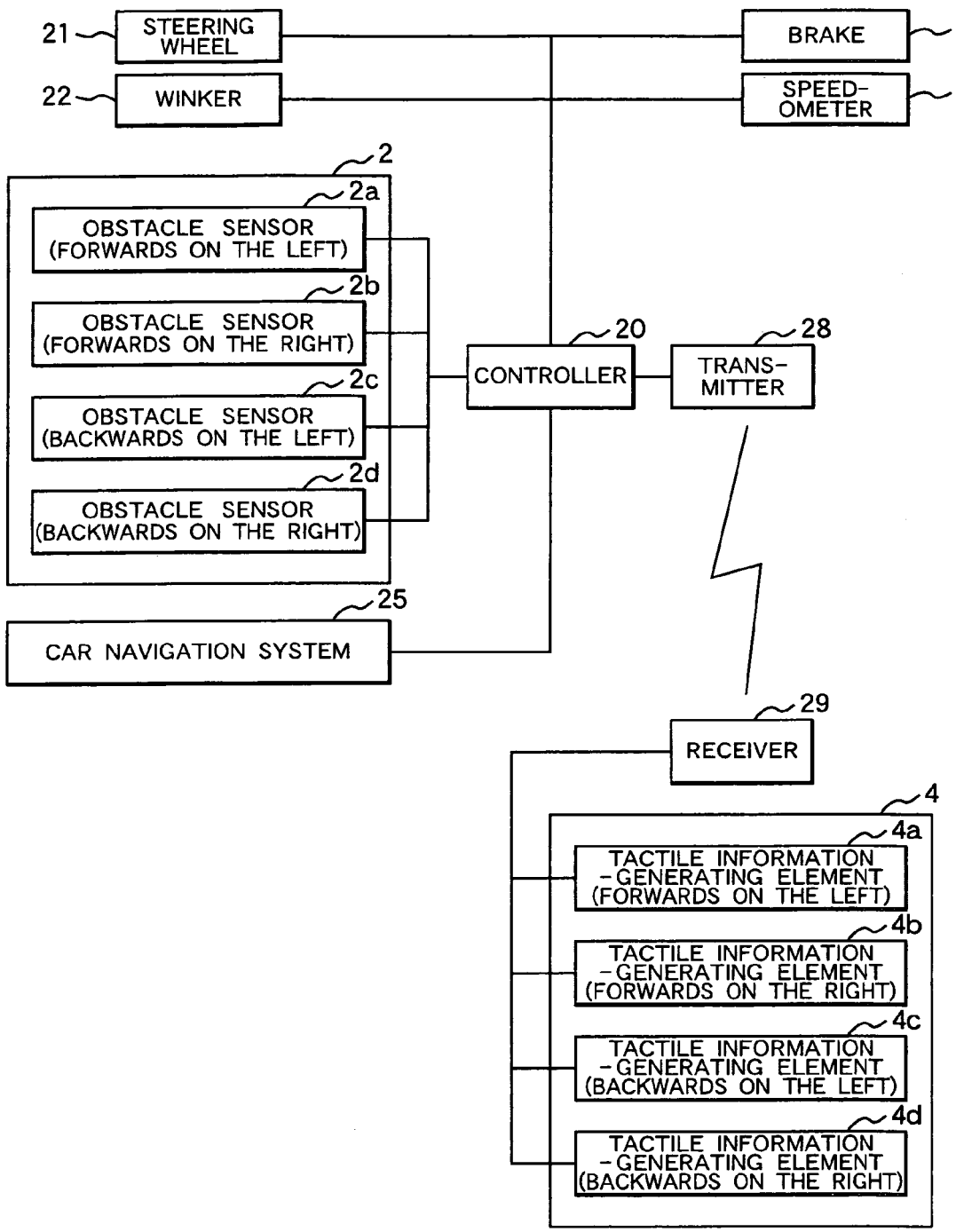
FIG. 13 is a block diagram representing the structure of another control system in a vehicle warning system of the present invention.

FIG. 13 is a block diagram representing the structure of another control system in a vehicle warning system of the present invention. In the block diagram of FIG. 11, various components are connected by wired means. As shown in FIG. 13, it is also possible to arrange such a configuration that a transmitter 28 for transmitting signals and a receiver 29 for receiving signals are provided between the tactile information-generating elements 4 and controller 20, and the tactile information-generating elements 4 are actuated by wireless means such as a radio. When the transmitter 28 and receiver 29 are installed between the controller 20 and tactile information-generating elements 4, it is possible to reduce the number of cables for connection between the controller 20 and tactile information-generating elements 4.

When the cushion-like device 18 shown in FIG. 9 is used on the wireless type, there is no cable between the controller 20 and tactile information-generating elements 4. This ensures easy removal of the cushion-like device 18.

The following describes the correspondence between the information from the obstacle sensors 2 and car navigation system 25 and the tactile information-generating elements 4 to be actuated based on the information, with reference to FIG. 14.

When an approaching obstacle is located forwards on the left, the obstacle is detected by the obstacle sensor 2a and the tactile information-generating element 4a is actuated. When the approaching obstacle is located forwards on the right, the obstacle is detected by the obstacle sensor 2b and the tactile information-generating element 4b is actuated. When the approaching obstacle is located backwards on the left, the obstacle is detected by the obstacle sensor 2c and the tactile information-generating element 4c is actuated. When the approaching obstacle is located backwards on the right, the obstacle is detected by the obstacle sensor 2d and the tactile information-generating element 4d is actuated. When the approaching obstacle is located in front, the obstacle is detected by the obstacle sensors 2a and 2b, and the tactile information-generating elements 4a and 4b are actuated. When the approaching obstacle is located in the rear, the obstacle is detected by the obstacle sensors 2c and 2d, and the tactile information-generating elements 4c and 4d are actuated. When the approaching obstacle is located on the left, the obstacle is detected by the obstacle sensors 2a and 2c, and the tactile information-generating elements 4a and 4c are actuated. When the approaching obstacle is located on the right, the obstacle is detected by the obstacle sensors 2b and 2d, and the tactile information-generating elements 4b and 4d are actuated.

In the controller 20, when a left-turn signal for guiding the left-turn has been received from the car navigation system 25, the tactile information-generating elements 4a and 4c are actuated. When a right-turn signal for guiding the right-turn has been received from the car navigation system 25, the tactile information-generating elements 4b and 4d are actuated.

Figure 15:
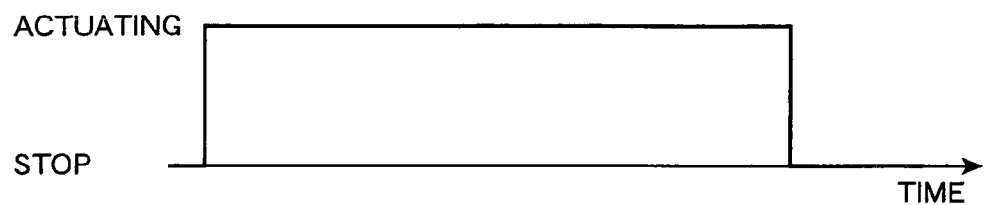
FIG. 15 is a diagram showing an example of the drive mode in the tactile information-generating element as an embodiment of the present invention.
Figure 16:
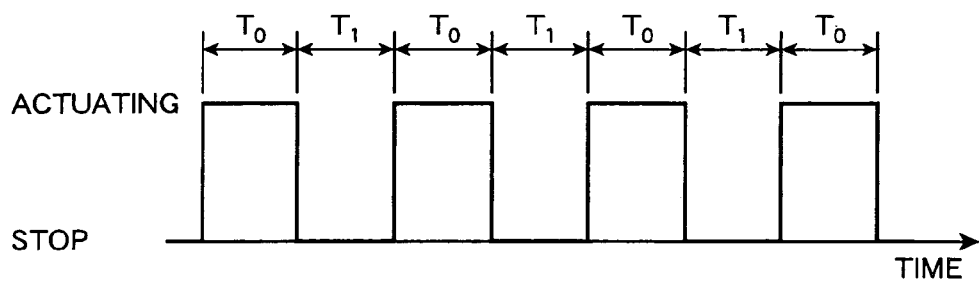
FIG. 16 is a diagram showing another example of the drive mode in the tactile information-generating element as an embodiment of the present invention.

When a drive instruction is given from the controller 20, the corresponding tactile information-generating elements 4 can be actuated continuously as shown in FIG. 15. As shown in FIG. 16, in the corresponding tactile information-generating elements 4, the mode of repeating the actuation T0 and stop T1 is also acceptable. FIG. 15 is a diagram showing an example of the drive mode in the tactile information-generating element as an embodiment of the present invention. FIG. 16 is a diagram showing another example of the drive mode in the tactile information-generating element as an embodiment of the present invention.

Figure 17:
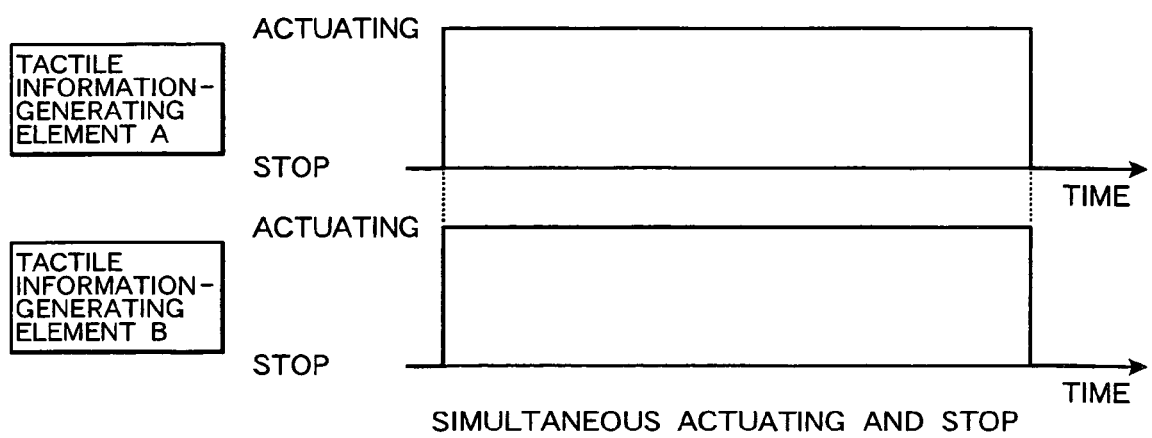
FIG. 17 is a diagram showing the first drive mode when driving two of the tactile information-generating elements as an embodiment of the present invention.
Figure 18:
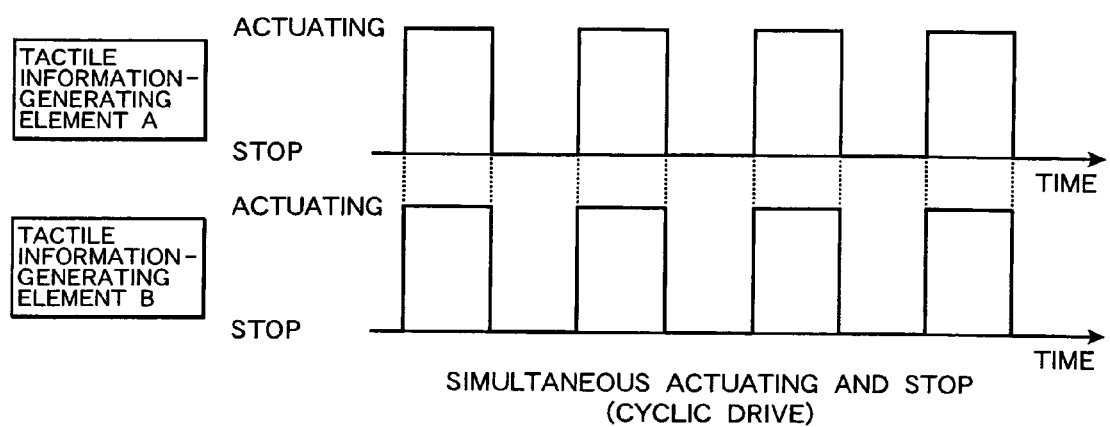
FIG. 18 is a diagram showing the second drive mode when driving two of the tactile information-generating elements as an embodiment of the present invention.
Figure 19:
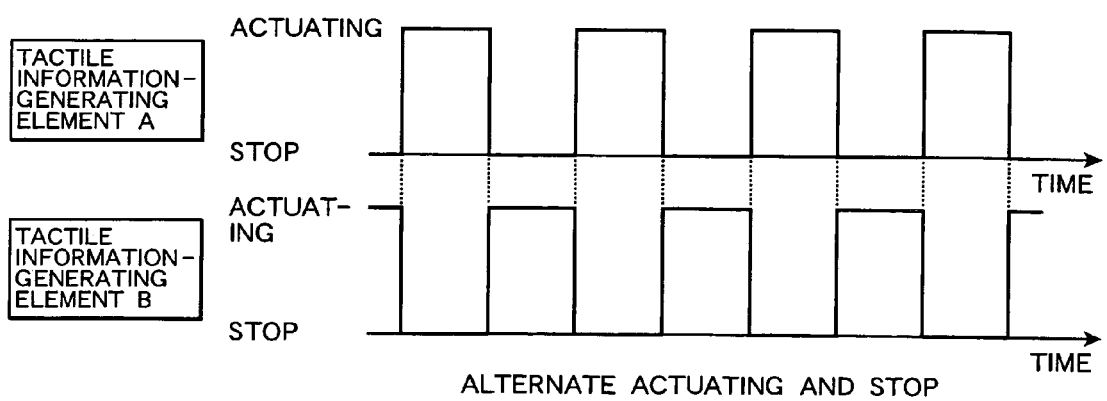
FIG. 19 is a diagram showing the third drive mode when driving two of the tactile information-generating elements as an embodiment of the present invention.

To ensure that the driver will not confuse the information on an approaching obstacle with the information from the car navigation system 25, the drive mode of the tactile information-generating element 4 is changed. For example, when an approaching obstacle is located on the left, the tactile information-generating elements 4a and 4c are actuated simultaneously. It is possible to use continuous actuation as shown in FIG. 17 (the first mode for actuating the two tactile information-generating elements of the present embodiment). It is also possible to repeat the actuating/stop procedure as shown in FIG. 18 (the second mode for driving the two tactile information-generating elements of the present embodiment). The tactile information-generating elements A and B shown in FIGS. 17 and 18 correspond to tactile information-generating elements 4a and 4c, respectively. When a left turn signal has been received from the car navigation system 25, the tactile information-generating elements 4a and 4c are actuated alternately as shown in FIG. 19 (the third mode for driving the two tactile information-generating elements of the present embodiment). The tactile information-generating elements A and B shown in FIG. 19 correspond to tactile information-generating elements 4a and 4c, respectively. The aforementioned procedure allows the driver to easily identify the information on an approaching obstacle and the information from the car navigation system 25.

Figure 20:
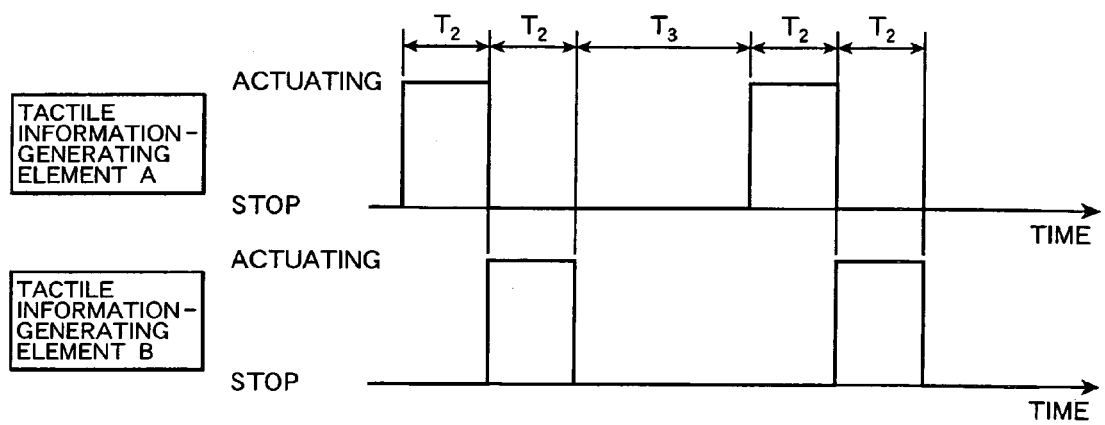
FIG. 20 is a diagram showing the fourth drive mode when driving two of the tactile information-generating elements as an embodiment of the present invention.

The following describes an example of the method of actuating the tactile information-generating element when an approaching obstacle is located in the front. In FIG. 14, the fore-tactile information-generating elements 4a and 4b of the seat 3 is actuated when an approaching obstacle is located in the front. Instead of it, the tactile information can be notified using the tactile information-generating elements 4a, 4b, 4c and 4d. FIG. 20 (the fourth mode for actuating two of the two tactile information-generating elements of the present embodiment) shows the method of driving the tactile information-generating elements 4 when a warning is issued by using the tactile information-generating elements 4a, 4b, 4c and 4d. The tactile information-generating element A of FIG. 20 corresponds to the tactile information-generating elements 4a and 4b, and the tactile information-generating element B corresponds to the tactile information-generating elements 4c and 4d. In this arrangement, the information on the approaching obstacle in front is notified by changing the timing of actuating the fore-tactile information-generating elements 4a and 4b at the seat 3 and the aft-tactile information-generating elements 4c and 4d, as shown in FIG. 20. In this case, by providing the interval time T3 where all the tactile information-generating elements are not actuated, the driver easily can identify actuating patterns of the tactile information-generating elements 4. If the T3 is not provided, it is difficult for the driver to identify which of the tactile information-generating elements 4 was actuated first. Accordingly, in this case, it is difficult to identify the drive patterns of the tactile information-generating elements 4.

Additionally, when the approaching obstacle is located in the rear, on the left or on the right, or when a right/left turn signal has been received from the car navigation system 25, the tactile information-generating element 4 can be operated in the same manner as in the above case. When the approaching obstacle is found in the rear, the tactile information-generating element A is actuated as tactile information-generating elements 4c and 4d, and the tactile information-generating element B is actuated as the tactile information-generating elements 4a and 4b. When the approaching obstacle is found on the right, the tactile information-generating element A is driven as tactile information-generating elements 4b and 4d, and the tactile information-generating element B is driven as the tactile information-generating elements 4a and 4c. When the approaching obstacle is found on the left, the tactile information-generating element A is driven as tactile information-generating elements 4a and 4c and the tactile information-generating element B is driven as the tactile information-generating elements 4b and 4d.

When a right turn signal has been received from the car navigation system 25, the tactile information-generating element A is actuated as tactile information-generating element 4a, and then the tactile information-generating element B is actuated as the tactile information-generating element 4b. (When a right turn signal has been received, the tactile information is generated from the element 4a to the elements 4b with the passage of time, and the driver is prompted to turn to the right.) When a left turn signal has been received from the car navigation system 25, the tactile information-generating element A is actuated as tactile information-generating element 4b, and then the tactile information-generating element B is actuated as the tactile information-generating element 4a. In this case as well, the actuating method of the tactile information-generating elements 4 are changed in order to ensure that the driver will not confuse the information on the approaching obstacle with the information from the car navigation system 25.

Figure 21:
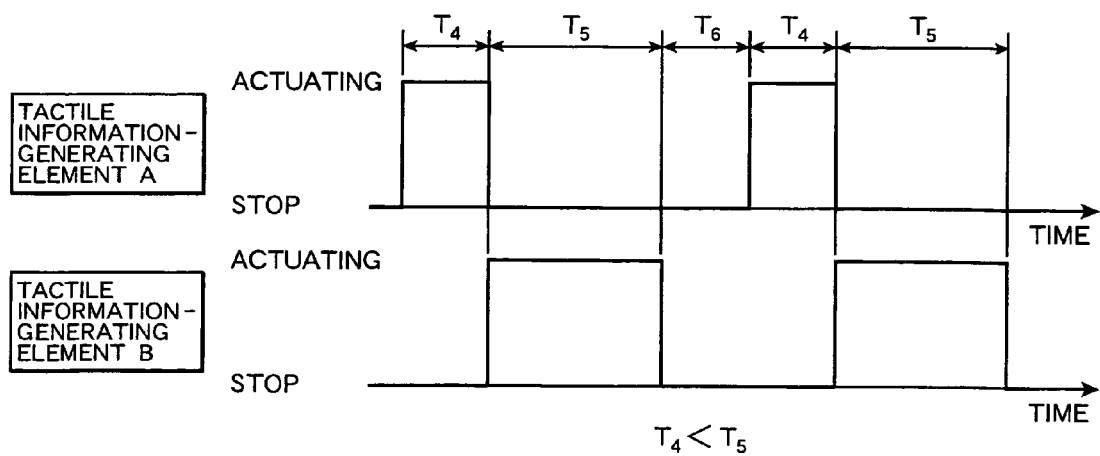
FIG. 21 is a diagram showing the fifth drive mode when driving two of the tactile information-generating elements as an embodiment of the present invention.

In the tactile information-generating elements 4, the actuating time for any tactile information-generating element 4 at the position to be enhanced may be set longer than for other tactile information-generating elements 4, as shown in FIG. 21 (the fifth mode for actuating the two tactile information-generating elements of the present embodiment). For example, when the right turn signal has been received from the car navigation system 25, the tactile information-generating element A of FIG. 21 is actuated as the tactile information-generating element 4a, and then the tactile information-generating element B is actuated as the tactile information-generating element 4b, wherein the tactile information-generating element 4b is actuated in an enhanced manner.

Additionally, when the approaching obstacle is found in front, in the rear, on the left or on the right, or when a left turn signal has been received from the car navigation system 25, the tactile information-generating elements 4 can be operated in the same manner as above. When the approaching obstacle is found in front, the tactile information-generating element A is actuated as the tactile information-generating elements 4c and 4d, and the tactile information-generating element B is actuated as the tactile information-generating elements 4a and 4b. When the approaching obstacle is found in the rear, the tactile information-generating element A is actuated as the tactile information-generating elements 4a and 4b, and the tactile information-generating element B are actuated as the tactile information-generating elements 4c and 4d. When the approaching obstacle is found on the right, the tactile information-generating element A is actuated as the tactile information-generating elements 4a and 4c, and the tactile information-generating element B is actuated as the tactile information-generating elements 4b and 4d. When the approaching obstacle is found on the left, the tactile information-generating element A is actuated as the tactile information-generating elements 4b and 4d, and the tactile information-generating element B is actuated as the tactile information-generating elements 4a and 4c. When a left turn signal has been received from the car navigation system 25, the tactile information-generating element 4 is actuated as the tactile information-generating element 4b, and the tactile information-generating element B is actuated as the tactile information-generating element 4a.

As described above, when an approaching obstacle is found in front, in the rear, on the left or on the right, or when a right/left turn signal has been received from the car navigation system 25, the tactile information can be informed to the driver as cues by changing the position (4a through 4d in FIG. 14) of any tactile information-generating element 4 to be actuated, and the actuated timing (FIGS. 17 through 21).

The vehicle warning system as an embodiment of the present invention employs tactile information to warn the driver of the approaching obstacle to the vehicle and to guide the driver to the destination through the car navigation system 25.

According to prior art practice, a voice or visual display on the console has often been used to notify an approaching obstacle. If voice is used for warning, the driver may not be able to catch a warning when listening to a car stereo or the like with comparatively high volume. If the warning is visual-displayed on the console, the driver has to shift his eyes to watch the console in order to recognize the approaching obstacle. Even if the driver has shifted the eyes to watch the console, some time is required to shift the eyes. This leads to a delay in avoiding the obstacle. Further, the warning devices based on tactile information having been proposed in recent years fail to allow a driver to easily identify the position of an approaching obstacle.

On the other hand, in the vehicle warning system of the present embodiment, the tactile information-generating element(s) 4 corresponding to the position of the approaching obstacle is actuated. This allows the driver to easily identify the position of the vehicle where the obstacle is approaching, and to take immediate action to avoid the obstacle. The approach of an obstacle to be detected by the vehicle warning system of the present invention includes: approach of another car when changing the traffic lane, approach of an obstacle such as another car by looking aside while driving, approach of an obstacle at an intersection where it is hard to see ahead, approach of an motorcycle or passenger backwards on the left when turning to the left, and approach of an obstacle when putting away the car in a garage.

The tactile information-generating element 4 is actuated in conformity to the destination by connection with the car navigation system 25, thereby guiding the driver to the destination. The vehicle warning system of the present embodiment does not use voice for the guide, and therefore, it does not occur that the driver fails to hear such vocal information. Further, the driver need not shift his eyes to watch the display of the car navigation system 25. This ensures the driver to concentrate his attention to driving to reach the destination.

The following describes the operation of the vehicle warning system of the present embodiment. The following description refers to only a pair of obstacle sensors 2 and tactile information-generating elements 4. The same description applies to other obstacle sensors 2 and tactile information-generating elements 4 as well. The correspondence among the obstacle sensors 2, car navigation systems 25 and tactile information-generating elements 4 conforms to the above description.

Figure 22:
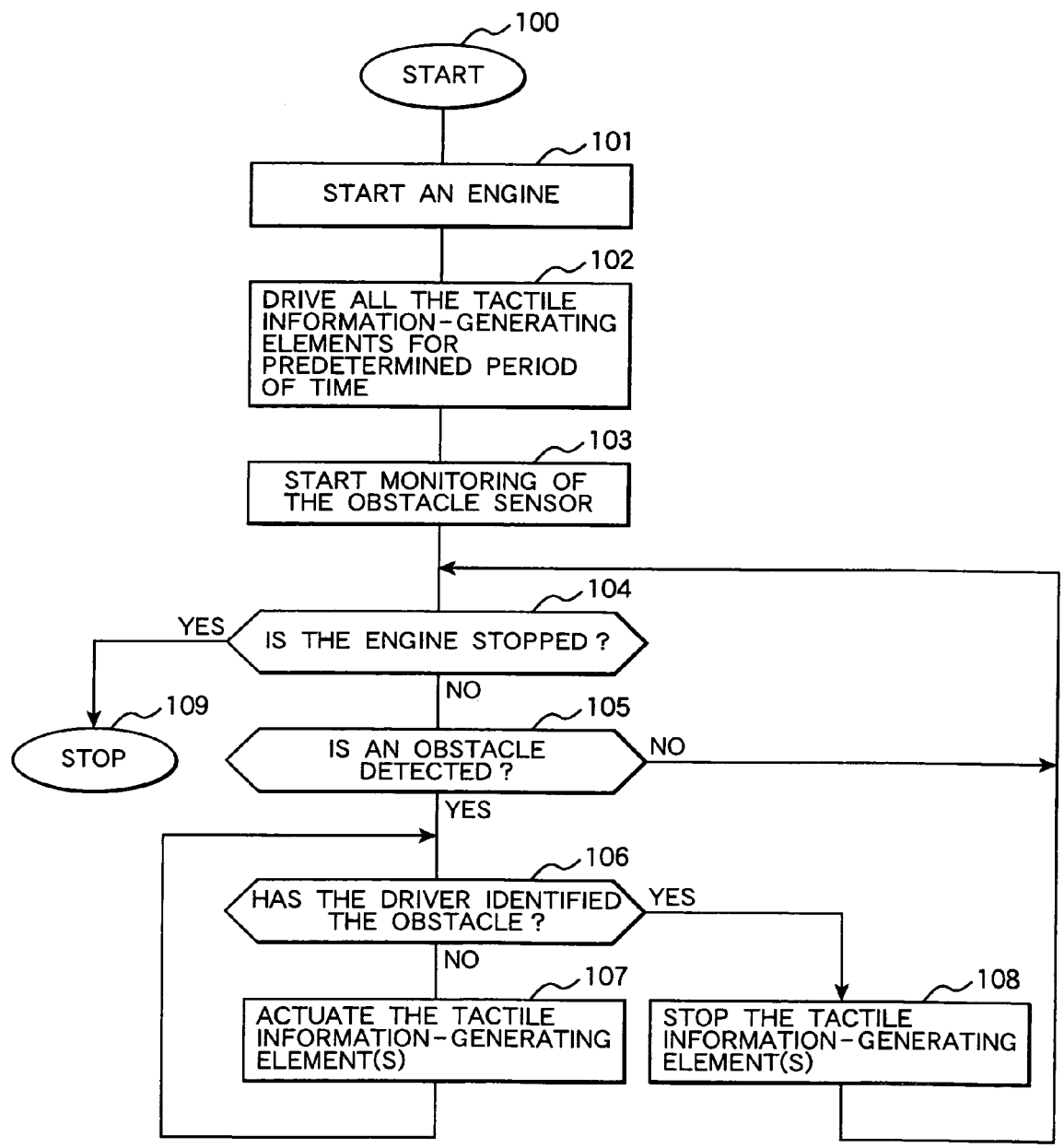
FIG. 22 is a flowchart representing the operation of warning an approaching obstacle in an embodiment of the present invention.

FIG. 22 is a flowchart representing the operation flow for warning an approaching obstacle in an embodiment of the present invention. In FIG. 22, an ignition switch is turned on in Step 101 and the engine starts. In Step 102, all the tactile information-generating elements 4 are actuated for a predetermined time. When all the tactile information-generating elements 4 are operating, there is no problem with the vehicle warning system. This allows the driver to confirm that the vehicle warning system is normal. Monitoring of obstacle by the obstacle sensors 2 is initiated in Step 103.

If the ignition switch is turned off and the engine is stopped in Step 104, the system goes to Step 109 to terminate control of the vehicle warning system. If the engine is not stopped in Step 104, a decision is made in Step 105 to see if the obstacle has been detected by the obstacle sensors 2 or not. Details of this decision in obstacle detection will be described later.

When the obstacle is away from the vehicle and is not yet detected in Step 105, the system goes to Step 104. When the obstacle is located close to the vehicle and has been detected in Step 105, a decision is made in Step 106 to determine whether or not the driver has identified the obstacle. Details of this decision in obstacle detection will be described later.

When it has been determined in Step 106 that the driver has already identified the obstacle, the tactile information-generating element 4 is stopped in Step 108, and the system goes to Step 104. When the tactile information-generating element 4 has not been started, it is kept stopped. When it has been determined in Step 106 that the driver has not yet identified the obstacle, the corresponding tactile information-generating element(s) 4 is(are) actuated in Step 107 and the system goes to Step 106.

Figure 23:
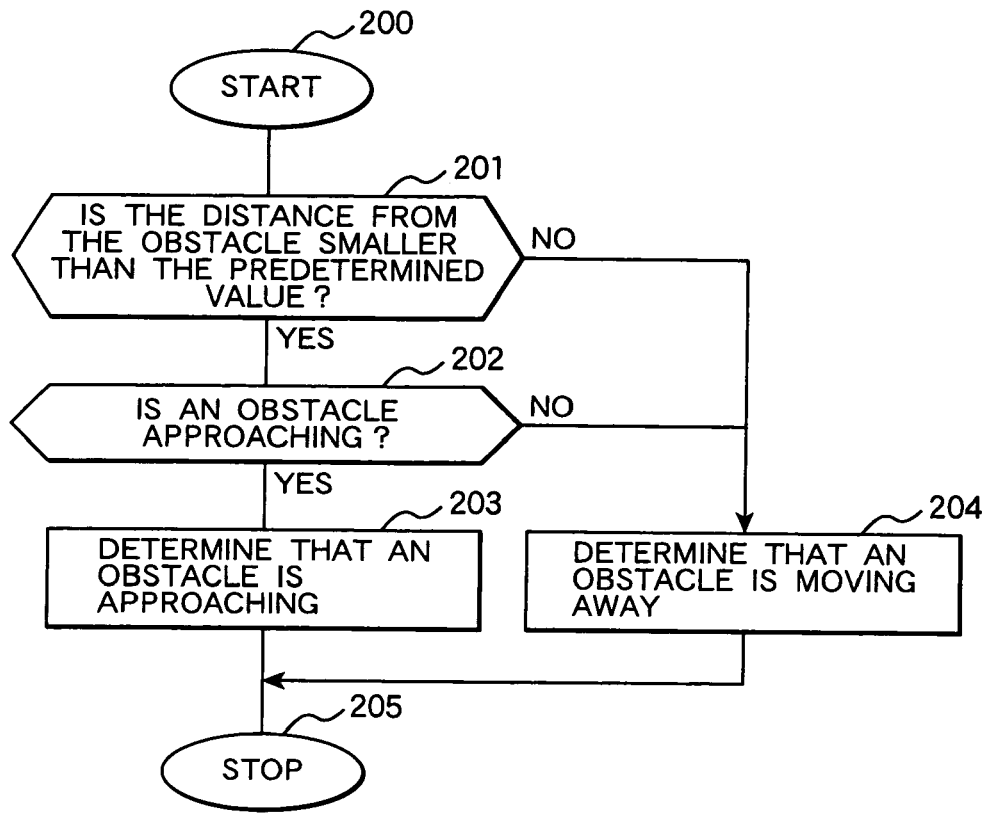
FIG. 23 is a flowchart representing the algorithm for detecting an obstacle by means of an obstacle sensor as an embodiment of the present invention.

Detection of an obstacle by the obstacle sensors 2 in Step 105 is performed according to the flowchart shown in FIG. 23. FIG. 23 is a flowchart representing the algorithm for detecting an obstacle by means of an obstacle sensor as an embodiment of the present invention. This operation flow is performed by the controller 20, based on the distance from the obstacle and relative velocity of the obstacle as viewed from the vehicle detected by the obstacle sensor 2.

In Step 201, a decision is made to see whether or not the distance from the obstacle is smaller than a predetermined value. When it has been determined in Step 201 that it is greater than the predetermined value, a decision is made in Step 204 that the obstacle is away from the vehicle. When it has been determined in Step 201 that the distance from the obstacle is smaller than the predetermined value, a decision is made in Step 202 to see whether or not the obstacle is coming closer to the vehicle. The relative velocity measured by the obstacle sensors 2 is used to determine whether or not the obstacle is coming closer to the vehicle. The relative velocity is determined by the difference in the distances between the vehicle and obstacle at past and present points. If the relative velocity of the obstacle as viewed from the vehicle is negative, a decision is made to determine that the vehicle is coming closer to the obstacle. Assume, for example, that the own vehicle speed is V2 and that of another vehicle as the obstacle is V1. The relative velocity is represented by vector V1-vector V2. If the vehicle traveling at 80 km/hour comes closer to another opposite car running at 100 km/hour, the relative velocity is −100−80=−180.

When it has been determined in Step 202 that the distance from an obstacle is reducing (negative relative velocity), a decision is made in Step 203 that the obstacle is coming closer to the vehicle. When it has been determined in Step 202 that the vehicle is not coming closer to the obstacle, a decision is made in Step 204 that the obstacle is located away from the vehicle.

As described above, when the distance from the obstacle is small and is being reduced, a decision step is taken to determine that the obstacle has come close to the vehicle. Monitoring of an approaching obstacle is executed for all the obstacle sensors 2 mounted on the body 1. This is executed repeatedly at a predetermined sampling cycle. The shorter the sampling cycle, the better the obstacle detection performance.

Figure 24:
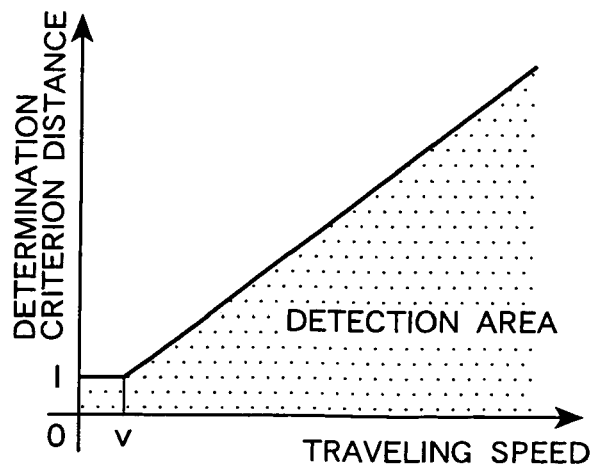
FIG. 24 is a diagram representing the relationship between the determined distance as the criteria for determining the distance between the vehicle and obstacle, and the vehicle traveling speed.

The predetermined distance as the criteria for determining the distance between the vehicle and obstacle in Step 201 is changed according to the vehicle traveling speed as shown in FIG. 24. The traveling speed is sent to the controller 20 from the speedometer 24. If the vehicle traveling speed is low, the determination criterion distance is reduced. If the vehicle traveling speed is high, the determination criterion distance is increased. This arrangement is the result of taking into accounts the relationship between the vehicle traveling speed and a required braking distance. Generally, if the vehicle traveling speed is high, the braking distance is long. If the vehicle traveling speed is low, the braking distance is short. This is because a warning will be useless if the driver cannot avoid collision with an obstacle even if taking a collision avoidance operation subsequent to warning.

If a comparative short determination criterion distance is applied when traveling on an expressway, and the criterion distance is about same as non-expressway case, an obstacle is hardly detected by the vehicle warning system. Because the required detecting distance from the obstacle is long in the normal traveling mode on the expressway. If an obstacle should have been detected, collision with the obstacle cannot be avoided since a sufficient braking distance cannot be ensured. On the other hand, a comparative long determination criterion distance is applied when the vehicle is parked into a garage, all the obstacles around the garage will be detected and a warning will be issued by the vehicle warning system at all times. This will lead to driver discomfort. This requires the determination criterion distance to be changed in conformity to the traveling speed. When the traveling speed is V or less as shown in FIG. 24, the determination criterion distance is set to 1. This arrangement allows an approaching obstacle to be detected even when the vehicle is parked. FIG. 24 is a diagram representing the relationship between the determination criterion distance between the vehicle and obstacle, and the vehicle traveling speed.

Figure 25:
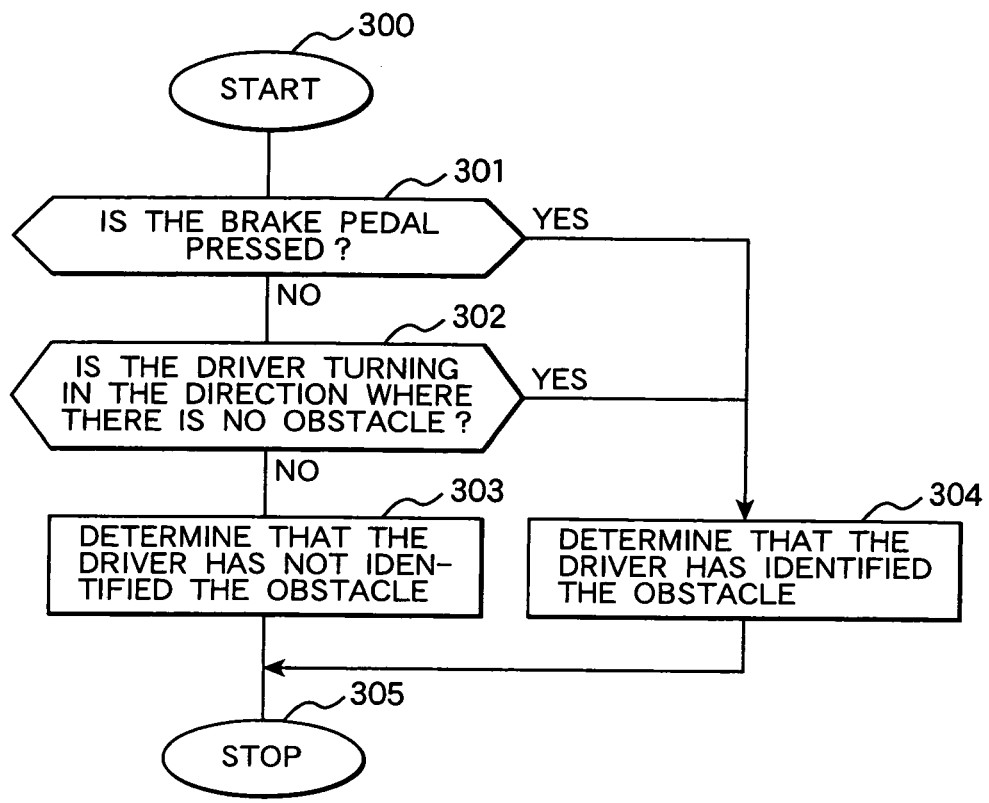
FIG. 25 is a flowchart representing the algorithm for determining whether or not the driver has identified the presence of an obstacle.

The flowchart of FIG. 25 will be used to explain the decision in Step 106 shown in FIG. 22 in determining whether or not the driver has identified the approach of an obstacle. FIG. 25 is a flowchart representing the algorithm for determining whether or not the driver has identified the approach of an obstacle.

In Step 301, a decision is made to see whether or not the driver has pressed the brake pedal. This is done by the controller 20 receiving the signal on whether or not the brake pedal has been pressed. When it has been determined in Step 301 that the driver has pressed the brake pedal, then a decision is made in Step 304 that the driver has identified the approaching obstacle. When it has been determined in Step 301 that the driver has not pressed the brake pedal, a decision is made in Step 302 to see whether or not the vehicle is making an attempt to turn in the direction where there is no obstacle. The information from the winker 22 or the steering angle sensor 26 of the steering wheel 21 and the information from the obstacle sensors 2 are received by the controller 20, where a decision is made.

When a decision is made in Step 302 to determine that the vehicle is making an attempt to turn in the direction where there is no obstacle, then a decision is made in Step 304 that the driver has recognized the approaching obstacle. When a decision is made in Step 302 to determine that the vehicle is making an attempt to turn in the direction where there is an obstacle, then a decision is made in Step 303 that the driver has not yet recognized the approaching obstacle.

As described above, whether or not any tactile information-generating element(s) 4 should be driven or not is determined by whether or not the driver has recognized the presence of the obstacle. If the driver has not recognized the presence of the obstacle, a warning is issued by the vehicle warning system. If the driver has already recognized the presence of the obstacle, a warning is not issued by the vehicle warning system. Whenever an approaching obstacle to the vehicle has been detected, a warning can be issued by the vehicle warning system. However, if warning is issued despite the driver having recognized the presence of the approaching obstacle, the driver will feel unpleasant. Accordingly, warning is not issued from the vehicle warning system when the driver has recognized the approaching obstacle, as described above.

As described above, a decision is made to see whether the corresponding tactile information-generating element(s) 4 should be actuated or not. Thus, only the required minimum warning is issued. This arrangement allows the vehicle to be driven without giving discomfort to the driver.

Figure 26:
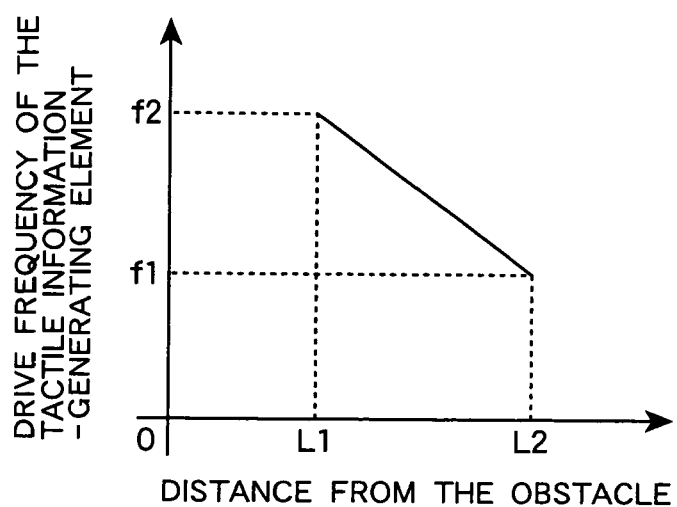
FIG. 26 is a diagram showing the relationship between the distance from the obstacle and the frequency for driving the tactile information-generating element.
Figure 27:
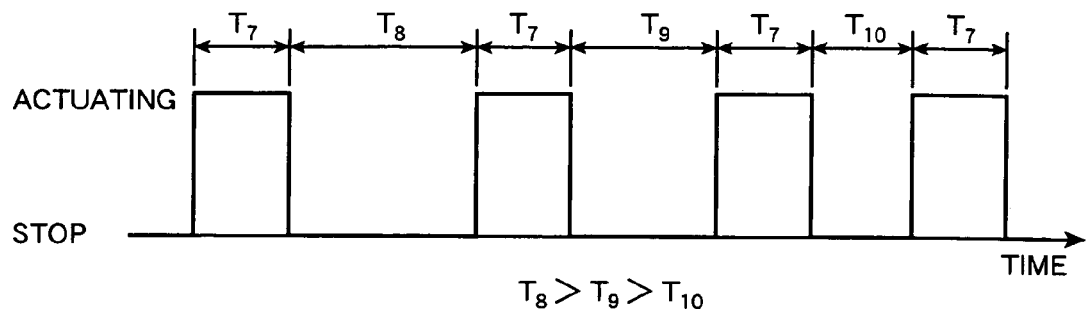
FIG. 27 is a diagram showing the change in the stopping time denoting the tactile information-generating element drive interval, in response to the distance from the obstacle.
Figure 28:
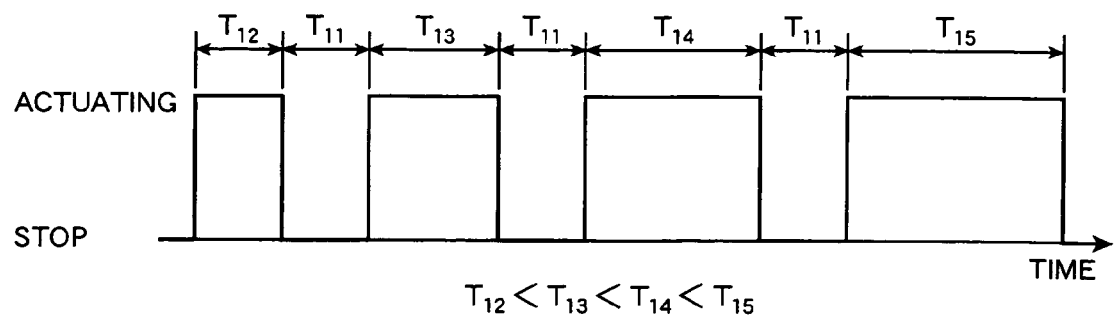
FIG. 28 is a diagram showing the method of changing the time for driving the tactile information-generating element, in response to the distance from the obstacle.

In Step 107 of FIG. 22, the actuating condition of the corresponding tactile information-generating element(s) 4 is changed in response to the distance from the obstacle. For example, the actuating (driving) frequency is changed in conformity to the distance from the obstacle, as shown in FIG. 26. It is also possible to arrange such a configuration that the actuating time T7 is kept constant and the stopping time T8 through T10 is gradually reduced with the approach of an obstacle, as shown in FIG. 27. Alternatively, the actuating time and stopping time may be gradually reduced with the approach of an obstacle. Or the actuating time T12 through T15 may be increased with the approach of the obstacle, as shown in FIG. 28. It is also possible to arrange such a configuration that the driving force of the tactile information-generating element 4 is gradually increased, instead of changing the actuating time of the tactile information-generating element 4 with the approach of the obstacle.

Figure 29:
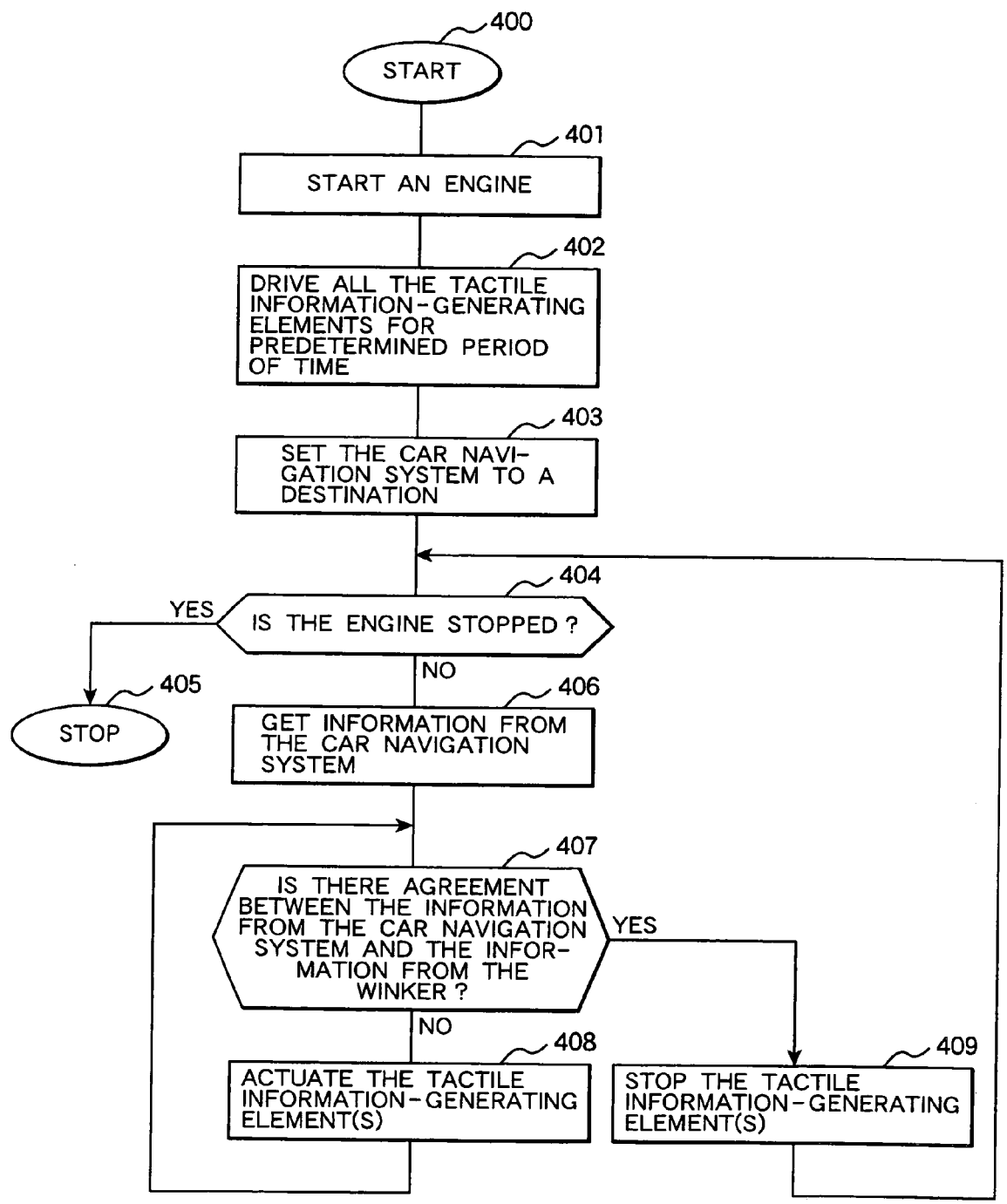
FIG. 29 is a flowchart representing the procedure of guiding to a destination.

The following describes the guide to the destination by connecting the warning information system with the car navigation system 25, with reference to the flowchart of FIG. 29. FIG. 29 is a flowchart representing the procedure of guiding to a destination.

In Step 401, the ignition switch is turned on and the engine starts. In Step 402, all the tactile information-generating elements 4 are actuated for a predetermined period of time. During the operation of the tactile information-generating elements 4, the vehicle warning system is under the normal conditions. This allows the driver to confirm that the vehicle warning system is normal. In Step 403, the driver uses the car navigation system 25 to set the destination. In this case, the destination is set using the controller of the car navigation system 25 or additionally a voice input device. If the driver does not set the destination in Step 403, the driver is not guided by the vehicle warning system of the present invention.

When the ignition switch is turned off to stop the engine in Step 404, the system goes to Step 405, and control of the warning system terminates. If the engine is not stopped in Step 404, information is captured from the car navigation system 25 in Step 406. During the travel of the vehicle, the car navigation system 25 transmits the direction information such as right turn or left turn information to the controller 20 in response to the destination. This destination information can be outputted at the timing shown on the display of the car navigation system 25 or at the timing of a voice instruction.

In Step 407, a decision is made to determine whether or not the direction information of the car navigation system 25 agrees with the information of the winker 22. This step is executed by the controller 20 receiving the direction information of the car navigation system 25 and the information of the winker 22.

If there is no agreement between the direction information of the car navigation system 25 and the information of the winker 22 in Step 407, the tactile information-generating elements 4 are actuated to issue a warning. If there is agreement between the direction information of the car navigation system 25 and the information of the winker 22 in Step 407, the tactile information-generating elements are stopped in Step 409. If the tactile information-generating elements have been stopped from starting, they are kept stopped.

When the tactile information-generating elements have been actuated in Step 408, the system goes back to Step 407, and a decision is made to determine whether or not there is agreement between the direction information of the car navigation system 25 and the information of the winker 22. This arrangement is intended to stop the tactile information-generating element 4 when the driver has recognized the tactile information issued from the tactile information-generating element 4, and has operated the winker 22 in the direction specified by the car navigation system 25. This allows the warning to be stopped immediately when the driver has taken notice of the warning, and permits the driver to drive the vehicle without being displeased.

To provide the driver the information on the route to reach the destination, the conventional car navigation system 25 has been using a voice device or visual display on the car navigation system 25. When the display on the car navigation system 25 is used, the driver is required to watch the display close to the intersection. This has prevented the driver from concentrating this attention to driving, in some cases. Further, when voice is used, the driver may not be able to catch a warning when listening to a car stereo or the like with the volume turned up high. On the other hand, if the tactile information-generating elements 4 provided at the seat 3 are used with the car navigation system 25 to provide the information to the driver on the route to the destination, the information for the destination is correctly transmitted to the driver without forcing the driver to shift his eyes from the front. Whether the vehicle warning system of the present invention should be operated or not can be determined by the driver selecting the switch installed on the console.

Figure 30:
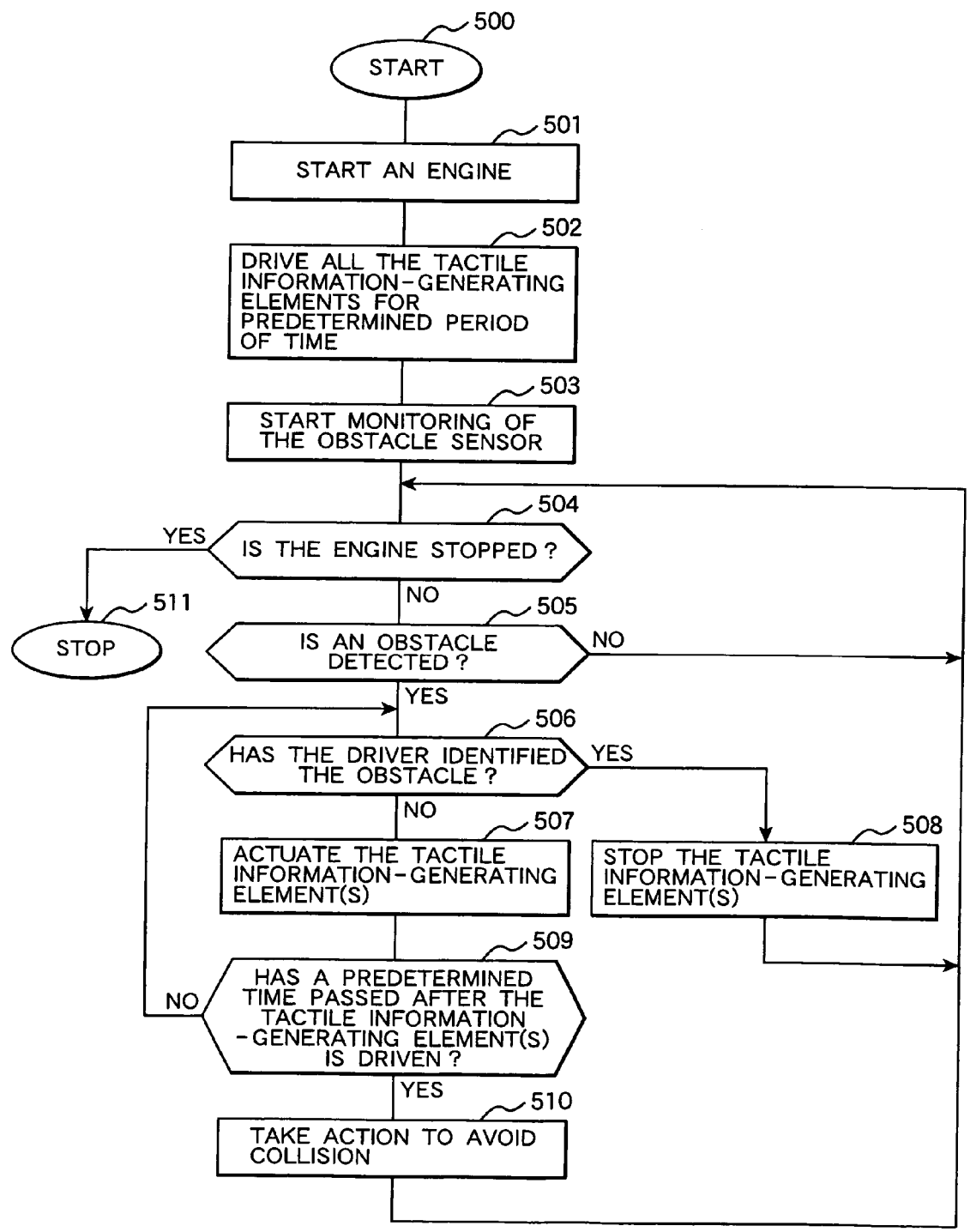
FIG. 30 is a flowchart representing an example of the second operation for warning the driver of an approaching obstacle, using the tactile information-generating element of the present embodiment.

The following describes an example of the second operation for warning the driver of an approaching obstacle, with reference to the flowchart of FIG. 30. FIG. 30 is a flowchart representing an example of the second operation for warning the driver of an approaching obstacle, using the tactile information-generating elements of the present embodiment. Processing in Steps 500 through 508 is the same as the processing in Steps 100 through 108 in FIG. 22, and will not be described to avoid duplication.

The corresponding tactile information-generating element(s) 4 is(are) actuated in Step 507, and, in Step 509, a decision is made to determine whether or not a predetermined time T has passed after actuating the tactile information-generating element(s) 4. If a predetermined time T has not yet passed in Step 509, the system goes to Step 506, and a decision is made to determine whether or not the driver has recognized the approaching obstacle. If a predetermined time T has passed in Step 509, a decision is made in Step 510 that the vehicle may collide with an obstacle, so that the vehicle warning system will take action to avoid collision with the obstacle. Then the system goes back to Step 504.

To ensure in Step 510 that the vehicle will not collide with the obstacle, the brake pedal is applied, for example. If the vehicle comes close to colliding with the obstacle, the brake 23 is pressed automatically without being pressed by the driver. This is done by the actuator (not illustrated) receiving a signal from the controller 20, thereby applying the brake, or by the actuator of the brake 23 being operated directly. If an approaching obstacle is found in the rear during the travel of the vehicle, action is taken not to allow the brake 23 to be applied, in order to avoid collision from the back.

If the vehicle, on condition of the driver being unaware of the presence of an obstacle, is going to turn by operating the steering wheel to the direction where the obstacle is present, a load is applied to the steering wheel by the load application section 27 installed on the steering wheel 21, in such a way that the driver cannot easily operate the steering wheel 21. If the vehicle is going to turn to the direction free of any obstacle, no load is applied to the steering wheel 21, and the steering wheel 21 can be operated as usual.

As described above, the steering wheel 21 and brake 23 are controlled, if the driver fails to take action to avoid collision with the obstacle when a predetermined time T has passed after actuating the tactile information-generating element 4. This procedure avoids collision with the obstacle, thereby ensuring improved safety.

The following describes the case where more than four tactile information-generating elements 4 are installed in the seat 3 shown in FIG. 3.

When more than four tactile information-generating elements 4 are installed, they are placed at four positions to ensure that the positional relationship of the vehicle in the forward, backward, right and left directions can be easily identified by the driver, as shown in FIG. 3. To put it another way, the tactile information-generating elements 4a-1 through 4a-3 correspond to the obstacle sensor 2a; the tactile information-generating elements 4b-1 through 4b-3 correspond to the obstacle sensor 2b; the tactile information-generating elements 4c-1 through 4c-3 correspond to the obstacle sensor 2c; and the tactile information-generating elements 4d-1 through 4d-3 correspond to the obstacle sensor 2d. In FIG. 3, twelve tactile information-generating elements 4 are installed. When they are installed in numbers other than twelve, the same principle applies.

When the tactile information-generating elements 4 are installed as shown in FIG. 3, they are actuated so that the tactile information is conveyed with rotation to the driver. For example, when an approaching obstacle is located forwards on the left, the tactile information-generating elements 4a-1, 4a-2 and 4a-3 are driven in that order. This procedure allows the driver to easily identify the approaching obstacle located forwards on the left. Other tactile information-generating elements are also actuated in the same way.

Figure 31:
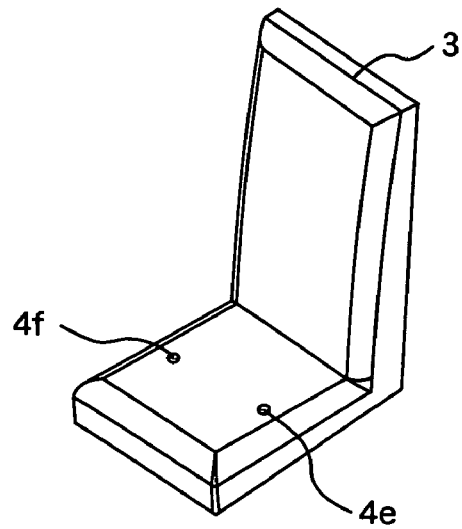
FIG. 31 is a diagram showing an example of the structure wherein the tactile information-generating elements as an embodiment of the present invention are installed at two positions on the right and left of the seat.
Figure 32:
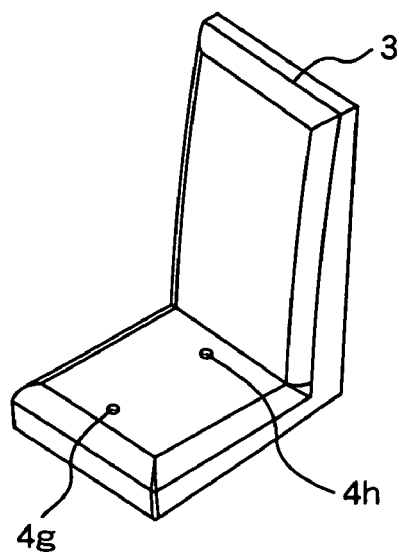
FIG. 32 is a diagram showing an example of the structure wherein the tactile information-generating elements as an embodiment of the present invention are installed at two positions in the front and rear.

In the example shown in FIG. 3, to warn the approaching obstacle in the forward, backward, right and left directions of the vehicle, more than four tactile information-generating elements 4 are installed. When a warning is given about an obstacle located only on the right and left, tactile information-generating elements 4 may be placed on two positions, right and left positions, of the seat 3, as shown in FIG. 31. Especially when only the car navigation system 25 is used for guidance to the destination, without the obstacle warning function being used, the number of the tactile information-generating elements 4 to be installed can be reduced. When a warning is to be issued only an obstacle on the forward and backward directions, the tactile information-generating elements 4 can be placed on the two positions with the fore and aft arrangement of the seat 3, as shown in FIG. 32. The actuating method and operation flow are the same as those described above, and will not be described to avoid duplication.

As described above, the present embodiment of the present invention is characterized by the following structure, function and effects. The present invention contains:

an obstacle sensor(s) for detecting an approaching obstacle to a vehicle, and/or a car navigation system for guiding the vehicle along the optimum route to the destination;

a tactile information-generating elements for providing the tactile information to the driver, based on the information from the obstacle sensor or the car navigation system; and a controller for controlling the actuation of the tactile information-generating element;

wherein the tactile information-generating elements are controlled according to the information from the obstacle sensor(s) or car navigation system, a steering wheel or winker, brake, and speedometer.

When an obstacle has been detected by the obstacle sensor 2 and it has been determined that the driver has not yet recognized the obstacle, the tactile information-generating element corresponding to the position of the obstacle sensor is actuated. If the driver recognizes the obstacle after the tactile information-generating element has been actuated, the tactile-information-generating elements are stopped.

The determination criterion distance for detecting the approach of an obstacle to the vehicle is changed according to the traveling speed of the vehicle. If the vehicle traveling speed is low, the determination criterion distance is reduced. If the vehicle traveling speed is high, the determination criterion is increased. When the driver has pressed the brake pedal or is going to turn in the direction where there is no obstacle, the driver is determined to have identified the obstacle and the tactile information-generating element is stopped.

The tactile information-generating element(s) is controlled based on the information of the winker and car navigation system. If there is no agreement between the direction information of the car navigation system and the information of the winker, the tactile information-generating element corresponding to the direction in which the driver is led by the car navigation system is actuated. If there is agreement between the direction information of the car navigation system and the information of the winker, the tactile information-generating element(s) is stopped.

What is claimed is:

1. A vehicle-warning system comprising:
an obstacle sensor for detecting approach of an obstacle to a vehicle;
tactile information-generating elements for providing tactile information as a cue to a driver based on information of said obstacle sensor; and
a controller for controlling said tactile information-generating elements; wherein,
said tactile information-generating elements are installed in a cushion of a driver seat with at least one of a fore-and-aft arrangement and a left-right arrangement;
said obstacle sensor measures a distance from said obstacle and a relative velocity of the obstacle as viewed from the vehicle;
said controller controls said tactile information-generating elements based on information from the obstacle sensor and information received from any of a steering wheel-sensor, a winker sensor, a brake sensor, and a vehicle speedometer;
said controller determines whether or not the driver has recognized approach of said obstacle, according to at least one of an output of brake information regarding whether or not a brake pedal has been pressed, and an output of information from said winker or steering wheel of whether or not the vehicle intends to travel in the direction where an obstacle is present;
if it has been determined that the approach of said obstacle has not yet been recognized, said tactile information-generating-elements are actuated to issue a warning by said controller; and
if it has been determined that the approach of said obstacle has been recognized, said tactile information-generating-elements are not actuated.

2. The vehicle warning system according to claim 1, wherein said tactile information-generating elements are installed in a cushion like-device put on the driver seat.

3. The vehicle warning system according to claim 1, wherein said controller executes control for selecting some tactile information-generating elements to be actuated out of all the elements or for changing actuating timings of said tactile information-generating elements to notify the driver a direction of an approaching obstacle.

4. The vehicle warning system according to claim 1, wherein said tactile information-generating elements are controlled by said controller through radio.

5. A vehicle warning system comprising:
a car navigation system for guiding a vehicle along a route up to a destination;
tactile information-generating elements for providing tactile information as a cue to a driver based on information from said car navigation system; and
a controller for controlling tactile information-generating elements; wherein,
said tactile information-generating elements are installed in a cushion of a driver seat with at least one of a fore-and-aft arrangement and a left-right arrangement;
said car navigation system outputs route-direction information for guidance;
said controller controls said tactile information-generating elements based on said route-direction information from said car navigation system and information from a winker for outputting right/left turn signal;
said controller determines whether or not the driver has recognized the guidance of said car navigation system from the right/left turn signal of said winker;
if it has been determined that the driver has not recognized the guidance of said car navigation system, said tactile information-generating elements are actuated to issue a warning by said controller; and
if it has been determined that the driver has recognized the guidance of said car navigation system, said tactile information-generating elements are not actuated.

6. The vehicle warning system according to claim 5, wherein:
if there is no agreement between the right/left turn signal in the direction information of said car navigation system and the right/left turn signal outputted from the winker, said tactile information-generating elements are actuated so as to issue the tactile information corresponding to the direction guided by said car navigation system; and
if there is agreement between them, the operation of the tactile information-generating elements are not actuated.

7. The vehicle warning system according to claim 5, wherein said controller executes control for selecting some tactile information-generating elements to be actuated out of all the elements or for changing actuating timings of said tactile information-generating elements to notify the driver a vehicle guide-direction issued by said car navigation system.

8. The vehicle warning system according to claim 5, wherein said tactile information-generating elements are installed in a cushion like-device put on the driver seat.

9. The vehicle warning system according to claim 5, wherein said tactile information-generating elements are controlled by said controller through radio.

10. A vehicle-warning system comprising:
an obstacle sensor for detecting approach of an obstacle to a vehicle;
tactile information-generating elements for providing tactile information as a cue to a driver based on information of said obstacle sensor; and
a controller for controlling said tactile information-generating elements; wherein,
said tactile information-generating elements are installed in a cushion of a driver seat with at least one of a fore-and-aft arrangement and a left-right arrangement;
said obstacle sensor measures a distance from said obstacle and a relative velocity of the obstacle as viewed from the vehicle;
said controller controls said tactile information-generating elements based on information from the obstacle sensor and information received from any of a steering wheel-sensor, a winker sensor, a brake sensor, and a vehicle speedometer;
a determination of whether or not said tactile information-generating elements should issue the tactile information as a warning to notify the approach of said obstacle to the vehicle, is executed by comparing the obstacle-approach distance with a determination criterion distance; and
said determination criterion distance is adjusted in according to the traveling speed of the vehicle, in such a way that the determination criterion distance is reduced or increased as the traveling speed is reduced or increased, respectively.

* * * * *